(12) United States Patent
Osborn et al.

(10) Patent No.: US 8,135,605 B2
(45) Date of Patent: Mar. 13, 2012

(54) APPLICATION RISK AND CONTROL ASSESSMENT TOOL

(75) Inventors: Frank Davis Osborn, Charlotte, NC (US); Jacob Firestone, Martinez, CA (US); David H. Weaver, Matthews, NC (US); Peter Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1016 days.

(21) Appl. No.: 11/279,301

(22) Filed: Apr. 11, 2006

(65) Prior Publication Data
US 2007/0239495 A1   Oct. 11, 2007

(51) Int. Cl.
*G06Q 10/00* (2006.01)
(52) U.S. Cl. .................................... 705/7.28; 705/7.38
(58) Field of Classification Search .................. 705/7.28
See application file for complete search history.

(56) References Cited

U.S. PATENT DOCUMENTS

| | | | |
|---|---|---|---|
| 6,219,805 B1 | 4/2001 | Jones et al. | |
| 6,529,900 B1* | 3/2003 | Patterson et al. | 1/1 |
| 6,631,211 B1* | 10/2003 | Schermer et al. | 382/225 |
| 6,876,992 B1 | 4/2005 | Sullivan | |
| 7,359,865 B1* | 4/2008 | Connor et al. | 705/10 |
| 2002/0124115 A1* | 9/2002 | McLean et al. | 709/310 |
| 2004/0059589 A1* | 3/2004 | Moore et al. | 705/1 |
| 2004/0186758 A1* | 9/2004 | Halac et al. | 705/7 |
| 2005/0027172 A1* | 2/2005 | Benavides et al. | 600/300 |
| 2005/0192963 A1* | 9/2005 | Tschiegg et al. | 707/9 |
| 2005/0197952 A1* | 9/2005 | Shea et al. | 705/38 |
| 2006/0080146 A1* | 4/2006 | Cook et al. | 705/2 |
| 2006/0089861 A1* | 4/2006 | King et al. | 705/4 |
| 2006/0136327 A1* | 6/2006 | You | 705/38 |
| 2006/0224500 A1* | 10/2006 | Stane et al. | 705/38 |
| 2006/0282276 A1* | 12/2006 | Venzon et al. | 705/1 |

OTHER PUBLICATIONS

Hesseldenz, Jon S. and Smith, Barbara G. "Computer-Prepared Questionnaires and Grouping Theories: Considerations for Mail Surveys in Academic Settings." Research in Higher Education vol. 6 (1977):85-94 (Hereinafter "Hesseldenz").*
Perry, William E. "A Quantitative Assessment of Internal Controls: Internal Auditors Can Fortify Their Assurance Efforts by Implementing a Systematic, Framework-based approach to control reviews." Internal Auditor, Apr. 2005.*
Yau, Chuk. "A Quantitative Methodology for Software Risk Control." Software Quality Institute, Griffith University, Nathan, Australia, Feb. 1994.*
Woehlke, James. "Risk Assessment." Associations Now, Washington, DC.: Nov. 2006. vol. 2, Iss. 12; p. 14 (Proquest Abstract).*
SAS. "SAS Positioned in Leaders Quadrant for Basel II Risk Management Applicantion Software Magic Quadrant." Business Wire, New York: Oct. 17, 2005. p. 1 (Proquest).*

(Continued)

*Primary Examiner* — Beth V Boswell
*Assistant Examiner* — Renae Feacher
(74) *Attorney, Agent, or Firm* — Banner & Witcoff, Ltd.; Michael A. Springs

(57) ABSTRACT

A tool to assess risks associated with software applications, and controls implemented to mitigate these risks, includes a first software component configured to gather information about the risks and controls, and a second software component configured to display the gathered information. The first software component includes a self-assessment tool which is invoked by a user to enter information reflective of risk levels over a number of risk categories. These risk levels are used to calculate a risk score associated with a particular application. The user also enters information as to whether or not a number of specific control attributes have been implemented, and this information is used to calculate a control score.

31 Claims, 31 Drawing Sheets

OTHER PUBLICATIONS

Car, Marvin J., Konda, Suresh L., Monarch, Ira, Ulrich, F. Carol, Walker, Clay F."Taxonomy-Based Risk Identification." Technical Report CMU/SEI-93-TR-6, ESC-TR-93-183, Jun. 1993.*

Proquest Search Nov. 19, 2011.*

Dialog Search Nov. 19, 2011.*

International Search Report mailed Mar. 13, 2008, 11 pages.

Carr, M.J., et al., "Taxonomy-Based Risk Identification" Technical Report Software Engineering Institute Carnegie Mellon University, CMU/SEI-93-TR-6, ESC-TR-93-183, Jun. 1993, Retrieved from the Internet: URL:http://www.sei.cmu.edu/pub/documents/9 3 reports/pdf/tr06.93.pdf>p. 7-p. 11.

Virine L et al. Institute of Electrical and Electronics Engineers: "Visualization of probabilistic business models" Proceedings of the 2003 Winter Stimulation Conference. WSC103. New Orleans, LA, Dec. 7-10, 2003, Winter Simulation Conference, New York, NY: IEEE, US, vol. vol. 2 of 2. Conf. 36, Dec. 7, 2003; pp. 1779-1786.

Yua, C Ed.—Institute of Electrical and Electronics Engineers: "A Quantitative Methodology for Software Risk Control" Proceedings of the International Conference on Systems, Man, and Cybernetics. San Antonio, Oct. 2-5, 1994, New York, IEEE, US, vol. vol. 2, Oct. 2, 1994.

PCT International Search Report, PCT/US2007/066472, mailed Mar. 13, 2008, 11 pages.

Carr et al.: "Taxonomy-Based Risk Identification" Technical Report Software Engineering Institute Carnegie Mellon University CMU/SEI-93-TR-6 ESC-TR-93-183, Jun. 1993, pp. I-IV, 1-24, A1-A16, B1-B24, C1-C6, Retrieved from the Internet: URL:http://www.sei.cmu.edu/pub/documents/93.reports/pdf/tr06.93.pdf>, p. 7-p. 11.

Virine et al., Institute of Electrical and Electronics Engineers: "Visualization of probabilistic business models" Proceedings of the 2003 Winter Simulation Conference, Wsc '03, New Orleans, LA, Dec. 7-10, 2003, Winter Simulation Conference, New York, IEEE, US vol., vol. 2 of 2, Conf. 36, Dec. 7, 2003, pp. 1779-1786.

Yau, Institute of Electrical and Electronics Engineers: "A Quantitative Methodology for Software Risk Control" Proceedings of the International Conference on Systems, Man, and Cybernetics, San Antonio, Oct. 2-5, 1994, New York, IEEE, US. vol., vol. 2, Oct. 2, 1994, pp. 2015-2020.

Office Action from U.S. Appl. No. 11/849,245, mailed Jun. 7, 2011.

* cited by examiner

| TAB | CATEGORY | DESCRIPTION | STATUS |
|---|---|---|---|
| IAR | RISK | INHERENT APPLICATION RISKS | complete |
| ISC | CONTROL | INFORMATION SECURITY CONTROLS | complete |
| PEC | CONTROL | PLATFORM / ENVIRONMENTAL CONTROLS | complete |
| PSC | CONTROL | PRODUCTION STABILITY CONTROLS | complete |
| VMC | CONTROL | VENDOR MANAGEMENT CONTROLS | complete |
| RCC | CONTROL | REGULATORY COMPLIANCE CONTROLS | complete |
| TAC | CONTROL | TECHNOLOGY ARCHITECTURE CONTROLS | complete |
| BPC | CONTROL | BUSINESS PROCESS CONTROLS | complete |
| BCC | CONTROL | BUSINESS CONTINUITY CONTROLS | complete |
| RCS | REVIEW | RISKS AND CONTROLS SCORING | complete |

(A) AN OVERALL APPLICATION RISK SCORE IS CREATED
(B) CONTROL SCORES COMBINE TO CREATE A SINGLE APPLICATION CONTROL SCORE
(C) COMBINED RISK AND CONTROL SCORES ARE COMPARED

FIG. 3

Inherent Application Risks:

| Field Definition | Information Rules | Answers |
|---|---|---|
| Internal/External | 1=N/A,<br>2=Internal - Associate Facing,<br>3=External - Vendor/market Facing,<br>4=External - Customer Facing,<br>5=Both Internal and External | |
| Upstream Application Dependencies<br>The number of applications upon which this application depends. | 1=N/A (stand alone),<br>2=1-5,<br>3=6-10,<br>4=>10 | |
| Downstream Application Dependencies<br>The number of applications that are dependent upon this application | 1=N/A (stand alone),<br>2=1-5,<br>3=6-10,<br>4=>10 | |
| Frequency of Production Code Changes | 1=None,<br>2=Low (yearly),<br>3=Medium (quarterly),<br>4=High (monthly),<br>5=Very High (weekly or greater frequency) | |
| Peak Number of Concurrent Users | 1=N/A,<br>2=10s,<br>3=100s,<br>4=1000s,<br>5=10,000s,<br>6=100,000s,<br>7=1,000,000 or greater,<br>8=Unknown | |
| Response Time Requirement | 1=N/A,<br>2=Minutes,<br>3=Seconds,<br>4=Sub-seconds | |

Inherent Application Risks:

| Field Definition | Information Rules | Answers |
|---|---|---|
| Peak Transaction Rate | 1=N/A,<br>2=Very low (only a few transactions per day),<br>3=Low (several transactions per hour),<br>4=Medium (several transactions per minute),<br>5=High (several transactions per second),<br>6=Very high (≥10 transactions per second) | |
| User Access Pattern | 1=N/A, (example: no user interface)<br>2=Sometimes Connected, (example: appl is periodically opened & closed)<br>3=Always Connected (example: teller application) | |
| Percentage of data periodically reviewed and certified as accurate | 1=>50%,<br>2=25-50%,<br>3=10-24%,<br>4=5-9%,<br>5=1-5%,<br>6=<1% | |
| Hours per week an average user works on the application (including preparation of the data)<br>Includes data entry, data collection, data/report generation, analysis, verification, formatting | 1=N/A (no user interface),<br>2=<1 Hour,<br>3=1-8 Hours,<br>4=8-24 Hours,<br>5=24-40 Hours | |
| Volume of Data Stored | 1=0 GB,<br>2=<1 GB,<br>3=1-5 GB,<br>4=6-10 GB,<br>5=11-50 GB,<br>6=51-100 GB,<br>7=101-500 GB,<br>8=501-1023 GB,<br>9=1-5 TB,<br>10=>5 TB | |

FIG. 4C

Inherent Application Risks:

| Field Definition | Information Rules | Answers |
|---|---|---|
| Data Growth Rate | 1=<1 GB/yr,<br>2=1-10 GB/yr,<br>3=10 GB/yr to 100 GB/yr,<br>4=100 GB/yr to 500 GB/yr,<br>5=500 GB/yr to 1 TB/yr,<br>6=>1 TB/yr,<br>7=Don't know | |
| Geographic Location of Data Stores | 1=N/A,<br>2=Single Site,<br>3=Multi-Site / Distributed Database,<br>4=Multi-Site International,<br>5=Don't know | |
| Geographic Location of Users | 1=N/A,<br>2=Local,<br>3=State,<br>4=Regional,<br>5=National,<br>6=International,<br>7=Don't know | |
| Application Patch Management | 1=Vendor patches are current / desired state of implementation achieved<br>2=Severity 1 or 2 patches not implemented >30 days<br>3=Severity 1 or 2 patches not implemented >60 days<br>4=Severity 1 or 2 patches not implemented >90 days | |
| Batch Processing Period | 1=N/A (online / realtime),<br>2=Monthly,<br>3=Biweekly,<br>4=Weekly,<br>5=Daily,<br>6=Hourly,<br>7=Other | |
| Regulatory Scrutiny of The Business Unit Activities supported By This Application | 1=Low,<br>2=Moderate,<br>3=High | |

Inherent Application Risks:

| Field Definition | Information Rules | Answers |
|---|---|---|
| Recovery Time Requirement | 1=48+ hours or greater, <br> 2=24+ hours to 48 hours, <br> 3=4+ hours to 24 hours, <br> 4=1+ hours to 4 hours, <br> 5=1 hour or less | |
| Highest Security Level Associated With Application Data | 1=Public, <br> 2=Proprietary, <br> 3=Confidential or Don't Know | |
| Vendor Involvement in Development and Ongoing Maintenance/Support | 1=In-house Developed and Maintained, <br> 2=Vendor-Developed / In-house Maintained, <br> 3=Vendor Developed and Maintained | |
| Select the Operating System With The Highest Risk Upon Which Your Application Depends | Risk ratings follow the "=" signs in the drop-down list | |
| Select the Development Language With The Highest Risk Upon Which Your Application Depends | Risk ratings follow the "=" signs in the drop-down list | |

FIG. 4E

APPLICATION 1 — 222

Information Security Controls: — 231

| Field Definition | Information Rules | Answers |
|---|---|---|
| Governance & Administration | | |
| 233A | Application security administration processes are documented | y |
| 233B | Security administration responsibilities are formally delegated and documented for all significant activities | n |
| 233C | Security administration processes are compliant with Corp Information Security standards | y |
| | Application access rights conform to job responsibilities, are periodically reviewed, and the review process is documented | y |
| | Application users are identified, authenticated and authorized in accordance with security standards | n |
| | A formal process ensures that access for terminated associates and contractors is immediately disabled, and access for transferred employees adjusted to conform to new job responsibilities in a timely manner | n |
| | Access rights are designed and maintained to ensure appropriate segregation of duties | y |
| | Production data is sanitized (scrubbed) for confidentiality prior to being made available for testing | n |

234A (dropdown: y / n)

Tabs: Application Header / Tabs Index / IAR / ISC / PEC / PSC / VMC / RCC / TAC / BPC / BCC / RCS / Assessment Rpt / Exceptions Rpt

APPLICATION 1 — 222

Platform/ Environmental Controls: — 241

| Field Definition | Information Rules | Answers |
|---|---|---|
| Change Control 242A | A formal documented change control process is used to manage all changes to this application | y |
| | Programmers are denied the ability to access production code and data | n |
| | Programmers are denied the ability to create, modify or delete production code | n |
| | Programmers are denied the ability to create, modify or delete production data | y |
| | Development, test and production environments are segregated and access restricted in accordance with job responsibilities | n |
| | A formal documented emergency change control process is in place and adhered to | y |
| Physical Security 242B | The mainframe, server, desktop or laptop upon which the application resides is maintained in a physically secure Tier 1 facility | y |
| | A formal documented process exists for granting and maintaining access to the physically secure environment | y |
| | Physical access controls and authorization are periodically reviewed and reviews documented | y |
| | All contractors, visitors and other non-authorized-associate access is logged and supervised | y |
| | Terminated and transferred associates are immediately denied physical access | y |

Tabs: Application Header / Tabs Index / IAR / ISC / PEC / PSC / VMC / RCC / TAC / BPC / BCC / RCS / Assessment Rpt / Exceptions Rpt

APPLICATION 1 — 222 — 251

Production Stability Controls:

| Field Definition | Information Rules | Answers |
|---|---|---|
| People 252A — 256 | Knowledgable primary and backup associates and/or contractors are available to support the ongoing maintenance of this application | n |
| 256 | Users are well informed and trained regarding use of this application | y |
| | Sufficiently detailed training and reference materials are available to users of the application | n |
| System Availability 252B — 256 | The application consistently meets or exceeds formal documented service level agreements | n/a — 253 |
| | If no formal documented service level agreement exists (No or N/A response to previous question), does the application consistently run at or near 100% availability | n |
| | A service level agreement exists between dependent application owners to assure that required data feeds are consistently and timely delivered | y |
| Problem Management 252C — 256 | A formal documented problem communication and escalation procedure has been established to manage problems in a timely and effective manner | y |
| 256 | Problems, if and when they occur, are consistently resolved in a timely manner | n |

255 (dropdown: y / n / n/a)
254

201E — Application Header / Tabs Index / IAR / ISC / PEC / PSC / VMC / RCC / TAC / BPC / BCC / RCS / Assessment Rpt / Exceptions Rpt

FIG. 5C

APPLICATION 1 — 222

Vendor Management Controls: — 261

| Field Definition | Information Rules | Answers |
|---|---|---|
| Vendor Involvement | This application was developed and / or is maintained by a vendor | y / n |
| Legal / Contractual — 266 | The vendor contract (including SLA's for service contracts) was developed with the assistance of, and approved by, Supply Chain Management (SCM) | n/a |
| Performance / SLA — 266 | A Service Level Agreement (SLA) is currently active, and performance criteria are monitored and met | n/a |
| | The SLA and / or contract is signed by authorized management of both the vendor and Company | n/a |
| | A Supplier Risk Survey has been completed within the past 12 months by the Supplier Manager | n/a |
| | Vendor performance is currently deemed satisfactory | n/a |
| Financial Stability | The Supply Chain Management team has verified the financial stability of the vendor in accordance with its review schedule | n/a |
| Information Security / Privacy — 266 | Vendor compliance has been formally verified and tested by Corporate Audit | n/a |
| | Vendor compliance has been formally verified and tested by Information Security | n/a |
| Intellectual Property | Ownership rights to vendor source code developed exclusively for the Company | n/a |
| | A third party trust account has been established for non-off the shelf source code storage | n/a |

262A — Vendor Involvement
262B — Legal / Contractual
262C — Performance / SLA
262D — Financial Stability
262E — Information Security / Privacy
262F — Intellectual Property Application Header / Tabs Index / IAR / ISC / PEC / PSC / VMC / RCC / TAC / BPC / BCC / RCS / Assessment Rpt / Exceptions Rpt

APPLICATION 1 — 222

Regulatory Compliance Controls: — 271

| Field Definition | Information Rules | Answers |
|---|---|---|
| Applicability — 276 | Regulatory requirement pertain to the business activity supported by this application | n |
| Application Development, Testing and Maintenance — 276 | Development specifications ensured that all relevant regulatory requirements, if applicable, were appropriately addressed within the application | n/a |
| | If applicable, the application was thoroughly tested for regulatory compliance prior to its introduction into the production environment and throughout its ongoing life cycle | n/a |
| | The application is currently known to be fully compliant with all relevant regulations | n/a |
| Reporting, Review and Follow up — 276 | If applicable, the application produces comprehensive actionable reports to ensure ongoing regulatory compliance | n/a |
| | If applicable, these reports are regularly reviewed and followed up as required | n/a |
| Sarbanes-Oxley | If applicable, detailed documented procedures support the production, review, escalation and resolution of reported regulatory issues | n/a |
| | If applicable, the application is fully compliant with all relevant aspects of Sarbanes-Oxley | n/a |
| International & Offshoring | If applicable, this application is fully compliant with all known country-specific regulations | n/a |
| | If applicable, all regulations associated with and/or resulting from offshoring development, maintenance and production processing of this application have been appropriately addressed | n/a |

Application Header / Tabs Index / IAR / ISC / PEC / PSC / VMC / RCC / TAC / BPC / BCC / RCS / Assessment Rpt / Exceptions Rpt

APPLICATION 1 — 222

Technology Architecture Controls: — 281

| Field Definition | Information Rules | Answers |
|---|---|---|
| Capacity | The platform upon which this application resides has adequate capacity for growth to meet current and anticipated future business needs — 286 | y |
| | The application has adequate capacity for growth to meet current and anticipated future business needs — 286 | n |
| | The network components utilized by this application have adequate capacity for growth to meet current and anticipated future business needs — 286 | n |
| Scalability | The application, its database and supporting platform will scale to accommodate anticipated future business needs — 286 | y |

282A — Capacity row
282B — Scalability row

Tabs: Application Header / Tabs Index / IAR / ISC / PEC / PSC / VMC / RCC / TAC / BPC / BCC / RCS / Assessment Rpt / Exceptions Rpt

| Application | | | | | Controls | | | |
|---|---|---|---|---|---|---|---|---|
| Group Executive | Technology Executive | Application Manager | Application Name | Risk Score | Color | Category | Sub-Category | Question | Response |
| Person 3 | Person 1 | Person 2 | Application 1 | R2 | | Info Security Controls | Governance and Admin | Application security administration processes are documented | y |
| | | | | | | | | Security administration responsibilities are formally delegated and documented for all significant activities | n |
| | | | | | | | | Security administration processes are compliant with Corp Information Security standards | n |
| | | | | | | | | Application access rights conform to job responsibilities, are periodically reviewed, and the review process is documented | y |
| | | | | | | | | Application users are identified, authenticated and authorized in accordance with security standards | y |
| | | | | | | | | A formal process ensures that access for terminated associates and contractors is immediately disabled, and access for transferred employees adjusted to conform to new job responsibilities in a timely manner | n |

Tabs: Application Header / Tabs Index / IAR / ISC / PEC / PSC / VMC / RCC / TAC / BPC / BCC / RCS / Assessment Rpt / Exceptions Rpt Labels: 350, 205, 222, 322, 354, 356, 352, 358, 201M

| Group Executive | Technology Executive | Application Manager | Application Name | App Symbol | Risk Score | ISC | PEC | PSC | VMC | RCC | TAC | BPC | BCC | Control Score |
|---|---|---|---|---|---|---|---|---|---|---|---|---|---|---|
| Person 3 | Person 7 | Person 31 | Application 27 | ■ | 7.02 | 9.41 | 9.41 | 10.00 | | 10.00 | 10.00 | 10.00 | 4.69 | 9.16 |
| Person 4 | Person 6 | Person 11 | Application 2 | ■ | 7.04 | 10.00 | 10.00 | 8.71 | 10.00 | | | 10.00 | | 8.59 |
| Person 3 | Person 6 | Person 41 | Application 3 | ■ | 8.53 | 8.33 | 9.41 | 10.00 | 10.00 | 10.00 | 10.00 | 10.00 | 10.00 | 9.56 |
| Person 3 | Person 6 | Person 41 | Application 28 | ■ | 7.54 | 8.89 | 9.41 | 10.00 | | 10.00 | 10.00 | 10.00 | 10.00 | 9.15 |
| Person 3 | Person 1 | Person 13 | Application 4 | ■ | 6.86 | | 9.41 | 5.36 | | | 10.00 | 4.50 | | 5.98 |
| Person 3 | Person 1 | Person 13 | Application 5 | ■ | 6.84 | 5.42 | 8.24 | 8.57 | 8.57 | 10.00 | 10.00 | 10.00 | 10.00 | 8.68 |
| Person 3 | Person 1 | Person 14 | Application 6 | ■ | 5.90 | 5.42 | 5.74 | 8.57 | | 10.00 | 8.57 | 10.00 | 4.69 | 7.06 |
| Person 5 | Person 8 | Person 15 | Application 7 | ■ | 6.59 | 10.00 | 8.24 | 10.00 | | 10.00 | 10.00 | 10.00 | 10.00 | 9.70 |
| Person 3 | Person 9 | Person 15 | Application 8 | ■ | 6.29 | 5.42 | 10.00 | 8.57 | 10.00 | 10.00 | 10.00 | 10.00 | 10.00 | 9.10 |
| Person 3 | Person 9 | Person 16 | Application 9 | ■ | 6.28 | 5.74 | 10.00 | 8.57 | 9.41 | 10.00 | 5.63 | 5.00 | | 6.98 |
| Person 3 | Person 10 | Person 32 | Application 10 | ■ | 6.68 | 5.16 | 8.24 | 8.57 | | 10.00 | 10.00 | 10.00 | 10.00 | 8.59 |
| Person 22 | Person 39 | Person 33 | Application 29 | ■ | 5.33 | 9.44 | 10.00 | 10.00 | | | 10.00 | 10.00 | 10.00 | 8.98 |
| Person 3 | Person 10 | Person 34 | Application 30 | ■ | 6.57 | | 9.41 | | | | | 4.69 | | 6.34 |
| Person 3 | Person 10 | Person 35 | Application 31 | ■ | 8.90 | 8.89 | 8.24 | 8.24 | | 10.00 | 10.00 | 10.00 | 10.00 | 9.29 |
| Person 3 | Person 1 | Person 36 | Application 32 | ■ | 6.53 | 4.69 | 8.81 | 5.36 | | 10.00 | | 10.00 | 10.00 | 5.63 |
| Person 3 | Person 10 | Person 42 | Application 33 | ■ | 8.61 | 8.24 | 10.00 | 10.00 | | 5.63 | 10.00 | 10.00 | | 9.41 |
| Person 22 | Person 20 | Person 37 | Application 34 | ■ | 9.04 | 4.58 | 5.74 | 10.00 | | 10.00 | 10.00 | | 8.75 | 7.03 |
| Person 5 | Person 8 | Person 38 | Application 35 | ■ | 9.33 | 5.74 | 9.41 | 5.63 | | | | 10.00 | 10.00 | 8.24 |
| Person 5 | Person 40 | | Application 36 | ■ | 10.00 | 9.44 | 10.00 | 10.00 | | 10.00 | 10.00 | 10.00 | 8.75 | 9.71 |

Report Header / Risk Assessment Scatter Chart / Risk Assessment Summary / Exceptions Summary / Exception Details

| Group Executive | Technology Executive | Application Manager | Application Name | App Symbol | Risk Score | ISC | PEC | PSC | VMC | RCC | TAC | BPC | BCC | Control Score |
|---|---|---|---|---|---|---|---|---|---|---|---|---|---|---|
| Person 5 | Person 19 | Person 45 | Application 38 | ▲ | 8.22 | 8.13 | 8.82 | 10.00 | 10.00 | 10.00 | | 10.00 | | 6.59 |
| Person 5 | Person 19 | Person 25 | Application 17 | ▲ | 10.00 | | 5.74 | 5.63 | | 10.00 | 10.00 | | 10.00 | 5.15 |
| Person 5 | Person 19 | Person 26 | Application 18 | ▲ | 8.57 | | 5.74 | 10.00 | | 5.63 | 10.00 | 6.57 | 2.26 | 6.03 |
| Person 5 | Person 19 | Person 26 | Application 19 | ▲ | 8.17 | 4.85 | 5.74 | 5.36 | | 2.26 | 10.00 | 4.59 | | 4.93 |
| Person 22 | Person 20 | Person 27 | Application 20 | ▲ | 8.25 | | 9.41 | 5.63 | 6.18 | 10.00 | 10.00 | 5.00 | 4.69 | 6.80 |
| Person 18 | Person 21 | Person 28 | Application 21 | ▲ | 8.50 | | 8.82 | 8.57 | 5.45 | 5.63 | 10.00 | 5.63 | 10.00 | 6.47 |
| Person 3 | Person 10 | Person 29 | Application 22 | ▲ | 8.52 | | 8.82 | 10.00 | | 10.00 | 10.00 | 5.63 | | 6.71 |
| Person 4 | Person 23 | Person 30 | Application 23 | ▲ | 8.04 | | | 10.00 | | 10.00 | 10.00 | 10.00 | | 5.28 |
| Person 3 | Person 2 | Person 13 | Application 24 | ○ | 8.77 | 5.29 | 8.33 | 10.00 | | 10.00 | 10.00 | 5.00 | | 5.45 |
| Person 3 | Person 1 | Person 31 | Application 25 | ○ | 9.35 | 4.85 | 4.85 | 10.00 | 10.00 | | | 5.63 | 10.00 | 6.03 |
| Person 22 | Person 24 | Person 32 | Application 26 | ○ | 8.95 | 5.29 | 5.29 | 10.00 | | 10.00 | 10.00 | 10.00 | 8.57 | 6.49 |

FIG. 11C

| Summary Control Exceptions | | | | | |
|---|---|---|---|---|---|
| Category | Sub-Category | Question | Question Key | "No" Responses | "No" Percentage |
| Info Security Controls | Governance and Admin | Production data is sanitized (scrubbed) for confidentiality prior to being made available for testing | ISC_A_8 | X1 | Y1% |
| Info Security Controls | Governance and Admin | An audit trail of attempted application security violations is produced, reviewed and followed-up in a timely manner responsibilities for review and follow-up are formally delegated and procedures documented | ISC_A_9 | X2 | Y2% |
| Platform / Environmental Controls | Change Control | Programmers are denied the ability to access production code and data | PEC_A_2 | X3 | Y3% |
| Business Continuity / Disaster Recovery Controls | Business Continuity Testing | This test included all critical financial and non-financial application functionality | BCC_B_2 | X4 | Y4% |
| Info Security Controls | Policies, Standards & Technical Baselines | Security Vulnerability assessments are periodically performed, results evaluated, and issues, if any resolved | ISC_C_4 | X5 | Y5% |
| Business Continuity / Disaster Recovery Controls | Business Continuity Testing | The plan has been successfully tested within the past 12 months, and the test was conducted in compliance with all applicable business continuity standards | BCC_B_1 | X6 | Y6% |
| Business Continuity / Disaster Recovery Controls | Business Continuity Testing | All issues (if any) identified as a result of this test were documented and have since been resolved and/or remediation plans implemented | BCC_B_6 | X7 | Y7% |
| Business Continuity / Disaster Recovery Controls | Business Continuity Planning and Maintenance | The plan uses the standard format and required date elements, and has been updated within the past 12 months | BCC_A_2 | X8 | Y8% |
| Business Continuity / Disaster Recovery Controls | Business Continuity Planning and Maintenance | The plan has been adequately and formally communicated to all impacted parties, and such communication is ongoing for purposes | BCC_A_3 | X9 | Y9% |

FIG. 12A

Summary Control Exceptions

| Category | Sub-Category | Question | Question Key | "No" Response | "No" Percentage |
|---|---|---|---|---|---|
| Info Security Controls | Governance and Admin | A formal process ensures that access for terminated associates and contractors is immediately disabled, and access for transferred employes adjusted to conform to new job responsibilities in a timely manner | ISC_A_6 | V1 | W1% |
| Info Security Controls | Governance and Admin | Application access rights conform to job responsibilities, are periodically reviewed, and the review process is documented | ISC_A_4 | V2 | W2% |
| Info Security Controls | Governance and Admin | Security administration processes are compliant with Corp Information Security standards | ISC_A_3 | V3 | W3% |
| Info Security Controls | Governance and Admin | Security administration responsibilities are formally delegated and documented for all significant activities | ISC_A_2 | V4 | W4% |
| Info Security Controls | Governance and Admin | Application users are identified, authenticated and authorized in accordance with Bank of America's security standards | ISC_A_5 | V5 | W5% |
| Info Security Controls | Governance and Admin | Application security administration processes are documented | ISC_A_1 | V6 | W6% |
| Info Security Controls | Governance and Admin | Access rights are designed and maintained to ensure appropriate segregation of duties | ISC_A_7 | V7 | W7% |

FIG. 12B

| Static counts for all applications having exceptions | | | | | | Total exceptions count: | 4962 | 100.00% |
|---|---|---|---|---|---|---|---|---|
| 6 | 24 | 138 | 432 | | | Filtered exceptions count: | 5 | 0.10% |
| Group Executive | Technology Executive | Application Manager | Application Name | Risk Score | Category | Sub-Category | Question | Response |
| Person 4 | Person 6 | Person 17 | Application 15 | R2 | Info Security Controls | Governance and Admin | Application access rights conform to job responsibilities are periodically reviewed, and the review process is documented | ISC_A_4 | n |
| Person 4 | Person 6 | Person 17 | Application 15 | R2 | Info Security Controls | Governance and Admin | Production data is sanitized (scrubbed) for confidentiality prior to being made available for testing | ISC_A_8 | n |
| Person 4 | Person 6 | Person 17 | Application 15 | R2 | Info Security Controls | Governance and Admin | An audit trail of attempted application security violations is produced, reviewed and followed-up in a timely manner-responsibilities for review and follow-up are formally delegated and procedures documented | ISC_A_9 | n |
| Person 4 | Person 6 | Person 17 | Application 15 | R2 | Info Security Controls | Policies, Standards & Technical Baselines | Security vulnerability assessments are periodically performed, results evaluated, and issues, if any, resolved | ISC_C_4 | n |
| Person 4 | Person 6 | Person 17 | Application 15 | R2 | Info Security Controls | Encryption | If applicable, data created and / or modified by this application is transmitted in compliance with transmission encryption standard | ISC_D_2 | n |

Report Header / Risk Assessment Scatter Chart / Risk Assessment Summary / Exceptions Summary / Exception Details

FIG. 13B

APPLICATION RISK AND CONTROL ASSESSMENT TOOL

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to a tool for collecting, analyzing and subsequently displaying information about the risks and controls associated with a plurality of objects of study. In one aspect, it is directed to such a tool configured to study various portfolios of software applications used by an organization.

2. Description of the Related Art

Organizations exist for a purpose. They have a vision, goals and specific objectives aimed at achieving the goals and realizing the vision. Risks are those factors that jeopardize the achievement of the organizational objectives, goals, or vision—that create uncertainty that the desire results will be achieved. Organizations must identify risks that put their objectives in jeopardy and deploy controls to reduce the risk exposure to acceptable levels.

When it comes to examining a portfolio of different endeavors, management is often hampered by the lack of consistent methods for (a) identifying and measuring the risk exposures associated with each endeavor, (b) digesting information about the degree to which controls have been implemented to combat those risks, and (c) linking these to accountability within the organization. This makes it extremely difficult for the organization to set priorities and to achieve an optimal allocation of resources toward risk control across the entire enterprise. This failure to establish an integrated risk and control assessment analysis tool exposes an organization to the chance that (a) a major risk may be overlooked that will prevent the achievement of the organization's objectives; and (b) resources will be wasted on inefficient and/or ineffective risk control efforts.

SUMMARY OF THE INVENTION

In one aspect, the invention is directed to a method for evaluating both risks and controls implemented to mitigate the risks associated with a plurality of objects, such as software applications. In the inventive method, for each of a plurality of objects, information sufficient to uniquely identify the object is received, risk input reflective of a risk level associated with each of a plurality of risk categories associated with that object is received, at least one risk score based on said risk input is computed, a plurality of control responses indicative of whether or not each of a plurality of control attributes has been implemented are received, and at least one control score based on said plurality of control responses is computed.

In another aspect, the invention is directed to a software tool configured to collect information about risks, and controls implemented to mitigate the risks, the risks and controls being associated with a plurality of software applications. The software tool is configured to receive information sufficient to uniquely identify each software application, receive risk input reflective of a risk level associated with each of a plurality of risk categories associated with said each software application, compute at least one risk score based on said risk input; and receive a plurality of control responses indicative of whether or not each of a plurality of control attributes has been implemented.

In still another aspect, the invention is directed to a software tool configured to help understand the nature of risks, and controls implemented to mitigate the risks, the risks and controls being associated with a plurality of software applications. The inventive software tool is configured to display information associated with both calculated risk scores and calculated control scores for a plurality of software applications, and permit filtering to study only a portion of said information.

BRIEF DESCRIPTION OF THE DRAWINGS

FIG. 3 shows an index page from the SAT detailing the tabs or links to other pages of the tool.

FIGS. 4A-4E collectively show exemplary inherent risks for which a user must provide input to establish a risk score for an application being assessed.

FIGS. 5A-5H each show one of eight control categories comprising questions/attributes for which a user must provide binary responses to establish a control score for an application being assessed.

FIG. 8 shows an exception report indicating the "no" responses to the questions/attributes provided by a user after the SAT has been invoked.

FIG. 11A shows a risk assessment summary table detailing component control metrics, and related information, from the RET.

FIGS. 11B & 11C show the effects of applying specific filters to the risk assessment summary table of FIG. 11A.

FIG. 12A shows an exceptions summary table from the RET, detailing statistics about assessed applications receiving "no" in response to the questions/attributes.

FIG. 12B shows the effect to applying specific filters to the exceptions summary table of FIG. 12A.

FIG. 13B shows the effect to applying specific filters to the exceptions detail table of FIG. 13A.

DETAILED DESCRIPTION

Figure 1A:
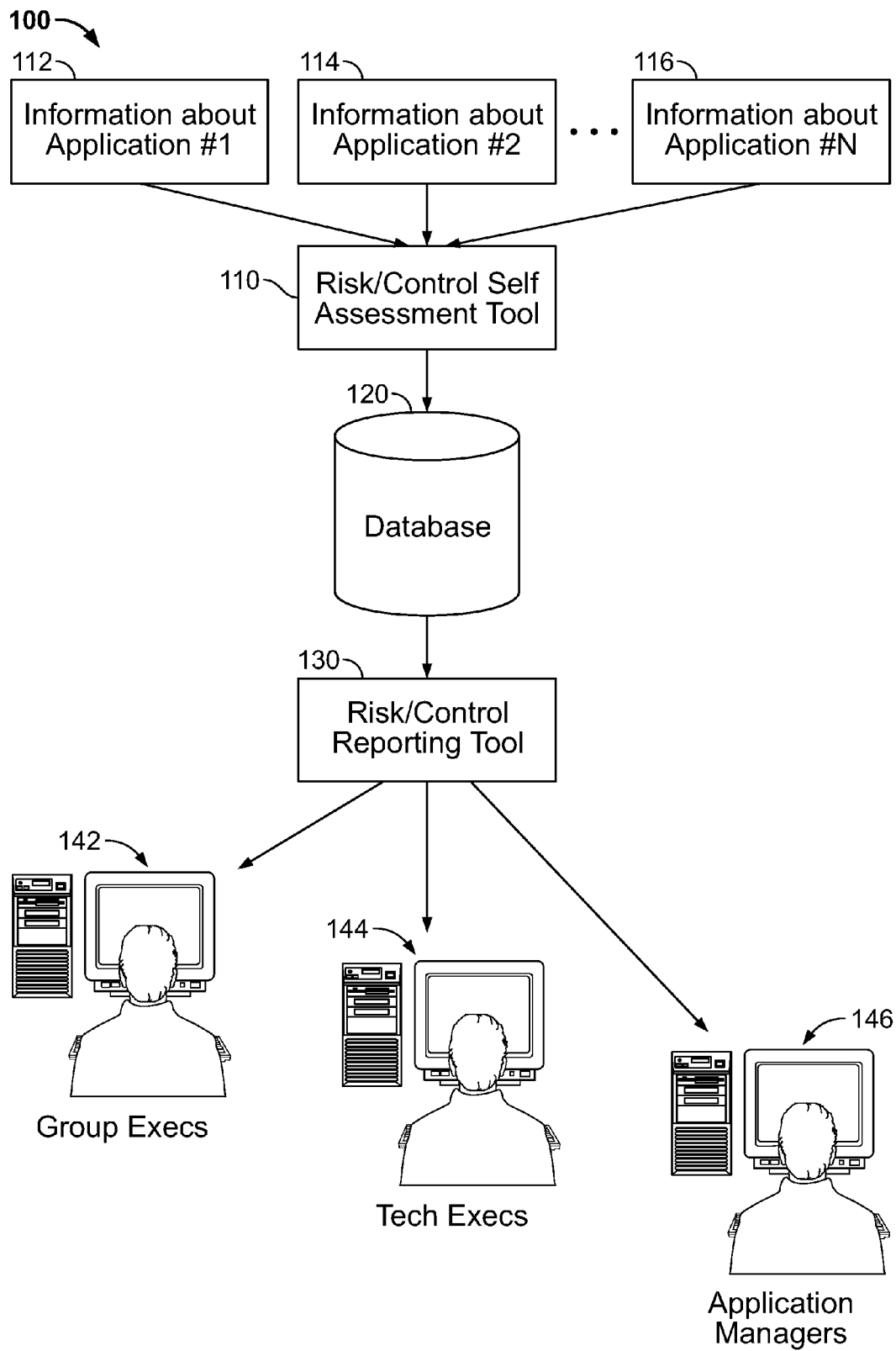
FIG. 1A shows a high-level overview of the operation of the present invention.

FIG. 1A shows a high-level overview 100 of the operation of the present invention, in the context of studying the risks and controls associated with software applications used by an organization, such as a government agency, a company, a non-governmental organization (NGO), or other entity.

On the data collection side, a risk/control self-assessment tool 110 ("SAT") is used by one or more individuals to enter information about each of a plurality of applications 102, 104, 106. In one embodiment, the manager in charge of that application is charged with inputting the required information for a corresponding application. Regardless of who enters it, the information is entered into a data store or database 120, associated with a computer. The database 120 may be a relational database, and preferably is implemented using an off-the-shelf product of a sort well known to those skilled in the art of data management and data design.

On the data output side, a risk/control reporting tool 130 ("RET") communicates with the data base 120 and makes available a wealth of information regarding the collected data. The reporting tool 130 may be accessed by a wide variety of responsible and/or interested individuals, especially those having a stake in the performance of those respective applications. Such individuals may belong to an organizational hierarchy within a business unit of the organization. As depicted in the exemplary situation of FIG. 1, these individuals may include high-level executives 142 within a business unit, technology executives 144 within a business unit, and individual application managers 146 belonging to that business unit. In one embodiment, the high-level executives 142 have supervisory authority over the technology executives 142 who, in turn, may have supervisory authority over the application managers. It is further understood that these titles are exemplary, and that in some embodiments, there is no hierarchical structure at all. It is understood that individuals within a hierarchy may have access to different, and sometimes overlapping, information that has been gathered.

Figure 1B:
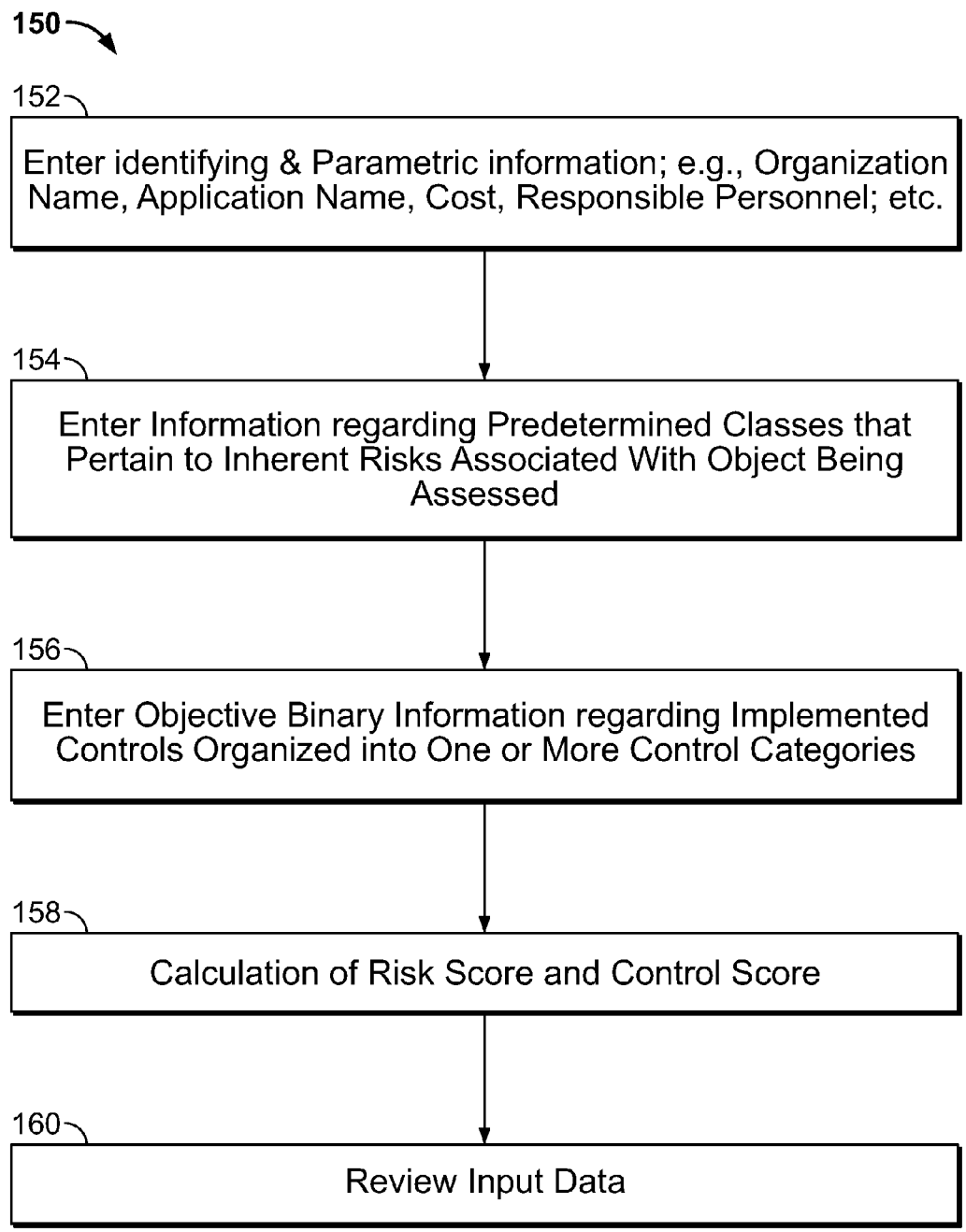
FIG. 1B shows a high-level process for entering risk and control information for a single object that is being assessed using a self-assessment tool implemented in accordance with the present invention.

Risk/Control Self-Assessment Tool ("SAT") 110 comprises a standard spreadsheet workbook containing multiple tabs. In a preferred embodiment, the SAT is implemented in MS-EXCEL®. The SAT tool 110 permits a submitter (i.e., a "user") to create a record within the database for a new object whose risk and control assessment information is to be added to the database 120. In the embodiment discussed herein, the object is a software application and the submitter may be the manager responsible for that software application. It is understood, however, that in other embodiments a variety of other objects and other responsible and/or interested individuals may enter this type of information, as appropriate. It is further understood that for other objects, the types of risks that are faced, and the types of controls that are implemented, may vary, as appropriate FIG. 1B shows a high-level diagram 150 for employing the SAT to create a new record associated with an object. In step 152, the user enters identifying and parametric information uniquely identifying the application including the business unit, the application name, costs to date of owning/developing that object; criticality of the object, and information sufficient to identify the people responsible for the object, such as high level managers, project managers and the like.

In step 154, the user provides information (discussed below) which captures information about various aspects of the inherent risk associated with the object of assessment.

In step 156, the user provides objective binary information (discussed below) regarding the controls that have been implemented to mitigate the risks. The controls typically are organized into a plurality of categories and sub-categories, so as to help understand the context in which they are implemented.

In step 158, the SAT calculates a risk score and a control score based on a predetermined algorithm.

Finally, in step 160, the user is able reviews the inputs he or she has provided, before the newly created record is added to the database 120. The user may, of course, edit previously input responses.

Figure 2:
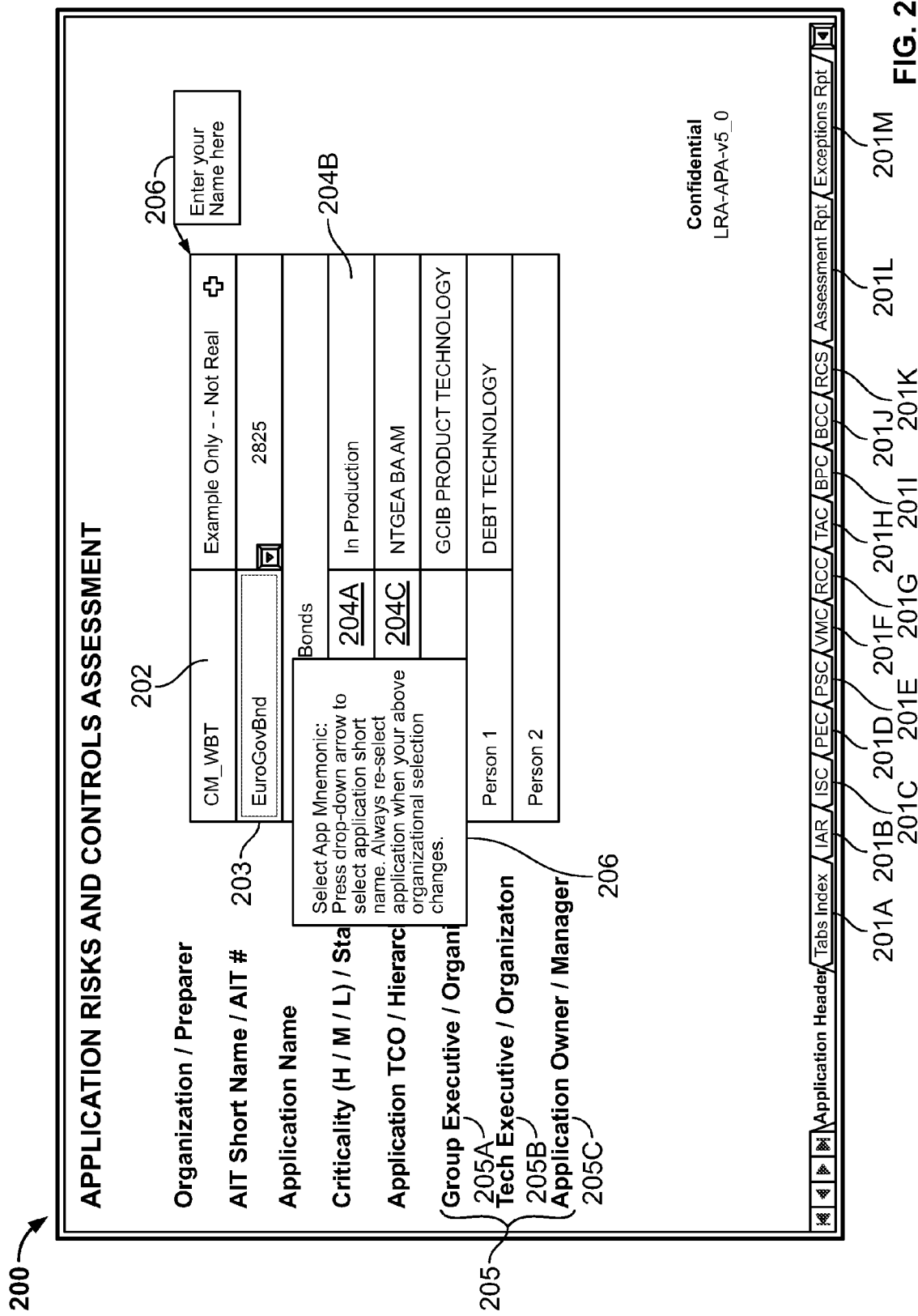
FIG. 2 shows an identifying information page of a risk/control self-assessment tool (SAT) for assessing software applications.

FIG. 2 shows an exemplary first page 200 of the SAT for one embodiment where the object is a software application. At the bottom of the first page are a number of tabs to which invoke different modules within the workbook. These include an index tab 201A, an inherent application risk tab 201B, eight control tabs 201C-201J, a risk control summary tab 201K. Also included are an assessment report tab 201L and an exceptions report tab 201M, which provide insight into the information tabulated to date.

The identification screen 200 requests information suitable for initiating a risk assessment (indexing and retrieving select data for a new application record). The information is to be entered into empty cells that are provided. Hovering a cursor over a select cells will produce a pop-up comment 206 explaining the cell usage. For most screens, clicking in a cell will usually produce a drop-down arrow which, when clicked, will produce a list of eligible answers to choose from.

A variety of information may be requested. This includes first information 202 identifying the interested business unit, second information 203 uniquely identifying the application (i.e., two or more applications cannot share the same exact second information), third information 204A indicating the criticality (high, medium low) of the application, fourth information 204B indicating the status of the application, and fifth information 204C indicating the total cost of owning/developing the application (TCO).

In addition, sixth information 205 identifying one or more responsible individuals within the relevant business unit may be received. As seen in FIG. 2, this sixth information includes identification of three people within an organizational hierarchy: a high-level business unit executive 205A, a technology executive 205B and the application manager 205C. Thus, information identifying two or more (and in this embodiment, three) individuals in an organizational hierarchy who are responsible for the application, is received. Thus, in one embodiment, all reporting reflects three levels of hierarchy responsible for the application. In other embodiments, different numbers of people, perhaps having different titles, and different organizational relationships amongst themselves, may be specified.

FIG. 3 shows the SAT's tabs index screen 207, which can be reached by clicking on the appropriate tabs index tab 201A. This screen 207 serves as a table of contents for the risk/control self-assessment tool. The tab sub-category 208 and tab description 209 explain the general nature and function of each tab 211, and the status 210 (complete or incomplete) of each assessment tab 201A-201K explains whether or not all input has been received for that item. Clicking on a corresponding status link 210A navigates the user to the screen(s) corresponding to the associated tab.

Figure 4A:
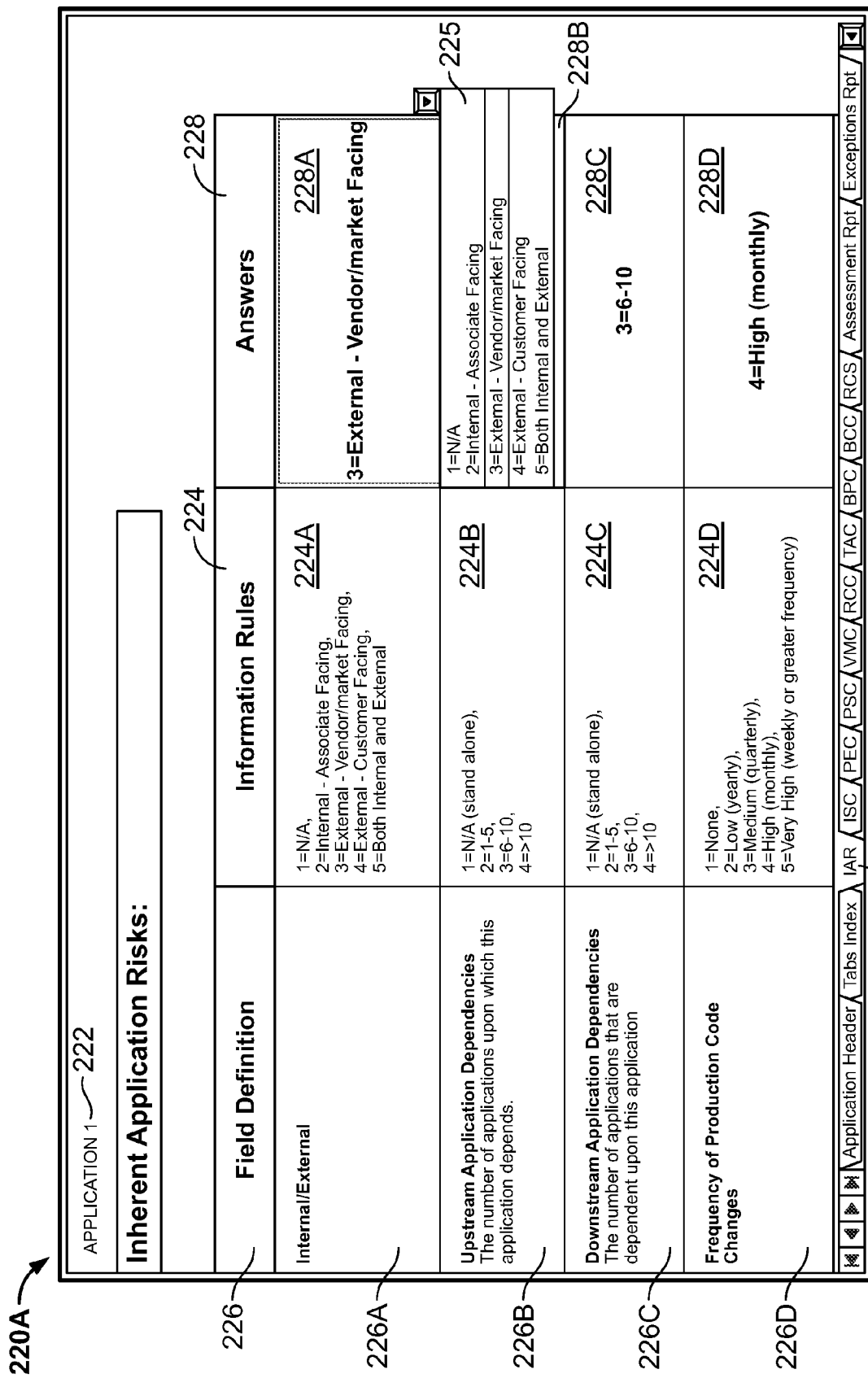

FIG. 4A shows the first screen 220A of SAT's inherent application risk (IAR) module for a particular application 222 named "Application 1". The full IAR module contains more questions than are shown on the first screen 215, and these are included in FIGS. 4B-4E on screens 220B-220E, respectively.

The IAR module captures risks inherent to key operational and business attributes of the application being assessed. The risks come in a plurality of risk categories 226. Each risk category has a set of rules 224 for scoring the risks, and for each of which the user must provide an answer 228 from a drop down menu of choices. In one embodiment, text entry is not permitted, with the exception for entering the name of the risk assessor. Each of these risk categories 226A, 226B, 226C and 226D has an associated set 224A, 224B, 224C and 224D of candidate risk levels. The user must select exactly one risk level from each set after opening a pull-down menu 225 by placing a cursor over the appropriate answer box 228A, 228B, 228C, 228D.

The candidate risk levels are 'ranked' such that a user response electing a higher ordinal number candidate risk level corresponds to higher risk. For instance, for candidate risk set 224B, while option '1' is that no other applications depends on this application in question, option '4' is that more than 10 other applications depend on this application. In this instance, the greater the number of other applications depending on this one application, the greater the risk. Thus, by supplying a risk input (i.e., selecting which option to choose), a user selects a risk level for that particular risk category.

Once all the answer boxes 224 are filled out, the IAR module calculates a risk score. In one embodiment, the risk score is calculated using the following methodology:

(1) Not applicable ("n/a") responses are thrown out (excluded from all further calculations).

(2) The numeric values of all responses are then summed to create a "numerator".

(3) The maximum possible numeric values of all responses are summed to create a "denominator".

(4) The numerator is divided by the denominator to create a "Risk Fraction" (a value between 0 and 1).

(5) The Risk Fraction is next multiplied by 10 to create a "Risk Ratio" (a value between 0 and 10).

(6) The Risk Ratio is then weighted: it is increased by the percent of total responses that were at their highest possible risk scores (up to a maximum Risk Ratio value of 10).

(7) The Weighted Risk Ratio is used (and shown) on the Risk and Controls Calculator Tab as the "Normalized" value for Inherent Application Risks (IAR).

It should be evident to those skilled in the art that other approaches may likewise be employed to arrive at a risk score. The important thing is that one arrive at a risk score that is more or less commensurate with the relative risks in a population of applications being evaluated.

Controls can offset ("balance" or "mitigate") inherent application risks. FIGS. 5A-5H each present the first screen for a particular category of candidate controls. It is understood that each category may have many such screens' worth of possible controls, but only one screen for each is shown in these figures. Each category of controls is organized into one or more sub-categories, and each sub-category has one or more attributes.

Attributes can come in different forms. In its most common form, an attribute is an affirmative statement regarding the implementation status of a control. Cast in another light, an attribute is merely a question which asks "Has_____been done?" Users are asked to indicate by 'yes' or 'no' answers, whether the control reflected by the attribute has indeed been implemented. Thus, in the most common form, a user is expected give a binary answer reflective of the truth status of the attribute. This is best illustrated with reference to a category of controls.

FIG. 5A presents a first screen 230 for the category of information security controls (ISC) 231 for the application named "Application 1" 222. The ISC category includes a "Governance and Administration" sub-category 232 which is characterized by one or more attributes, designated 233A, 233B, 233C, etc. It is understood that the ISC category may include other sub-categories as well, which do not appear on first screen 230. Attribute 233A is a statement reading "Application security administration processes are documented". Upon seeing this attribute, the user places a cursor over the corresponding "Answers" box 234A, thereby opening a menu of possible responses (i.e., "y" or "n" or "n/a"), and picks one depending on the whether the statement is true or false. The user repeats this for each attribute within each sub-category for the ISC category. If the user is unsure about the status of a particular attribute, the user may skip it for the time being and return to it at a later time while the SAT preserves the responses in the database 120.

FIG. 5B presents a first screen 240 for the category of platform/environment controls (PEC) 241 for the application named "Application 1" 222. The PEC tab captures the effectiveness of the application's platform and environmental controls. The PEC category includes at least two sub-categories: "Change Control" 242A and "Physical Security" 242B, and each of these has associated attributes, shown generally as 246. Again, the user responds with 'yes'/'no' inputs.

FIG. 5C presents a first screen 250 for the category of production stability controls (PSC) 251 for the application named "Application 1" 222. The PSC tab captures the status of application controls relating to people, system availability and problem management. The PSC category includes at least three sub-categories 252A, 252B, 252C, each having one or more attributes, shown generally as 256. As seen in pull-down menu 255, for some attributes, the user is given a choice of responding with any one of 'y', 'n' and 'n/a' ('not applicable'). And as evidenced by answer boxes 253 and 254, the responses to attributes within a given sub-category include yes/no responses as well as 'n/a' responses, where appropriate.

FIG. 5D presents a first screen 260 for the category of vendor management controls (VMC) 261 for the application named "Application 1" 222. The VMC category captures the effectiveness of vendor management controls relating to the application. Because some applications may have no substantial vendor involvement, all answers in this category, except the first, support an "n/a" choice. The VMC category includes at least six sub-categories 262A, 262B, 262C, 262D, 262E, 262F, each having one or more attributes, shown generally as 266. In the case of the attributes 266 shown, all responses are binary (of the 'yes'/'no' variety).

FIG. 5E presents a first screen 270 for the category of regulatory compliance controls (RCC) 271 for the application named "Application 1" 222. The RCC category captures the application's adherence to certain regulatory and compliance controls. The RCC category includes at least five sub-categories 272A, 272B, 272C, 272D, 272E, 272F, each having one or more attributes, shown generally as 276. Because some applications may have no substantial regulatory or compliance involvement, all answers on this tab, except for the first, support an "n/a" choice.

FIG. 5F presents a first screen 280 for the category of technology architecture controls (TAC) 281 for the application named "Application 1" 222. The TAC category measures the viability of the application's technology architecture in addressing growth and business needs. The TAC category includes at least two sub-categories 282A, 282B, each having one or more attributes, shown generally as 286.

Figure 5G:
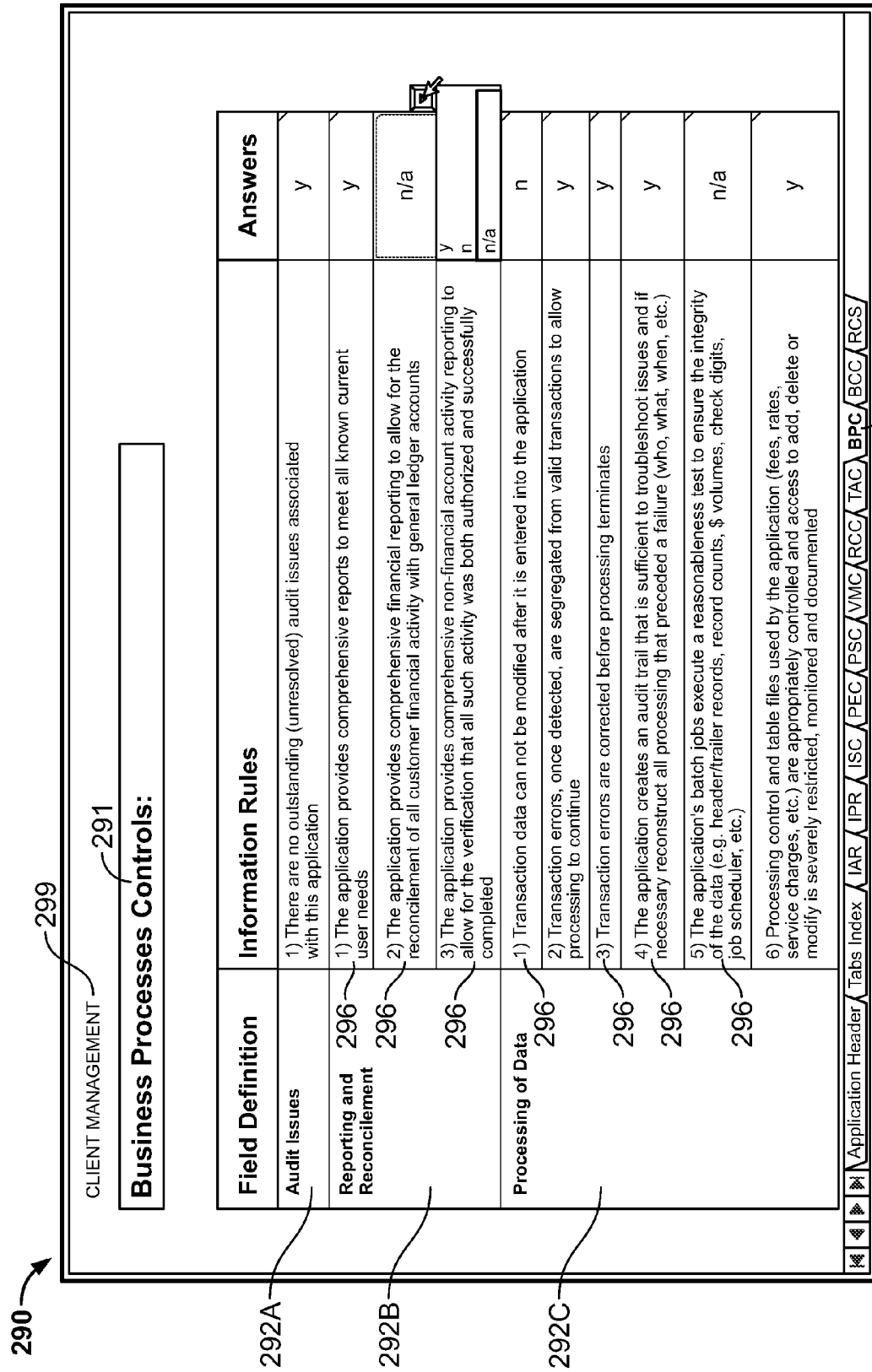

FIG. 5G presents a first screen 290 for the category of business process controls (BPC) 291 for the application named "Client Management" 299. The BCC category assesses the effectiveness of the application's business continuity and recovery controls. The BPC category includes at least three sub-categories 292A, 292B, 292C, each having one or more attributes, shown generally as 296. The BPC tab assesses the application's ability to satisfy select business process needs.

Figure 5H:
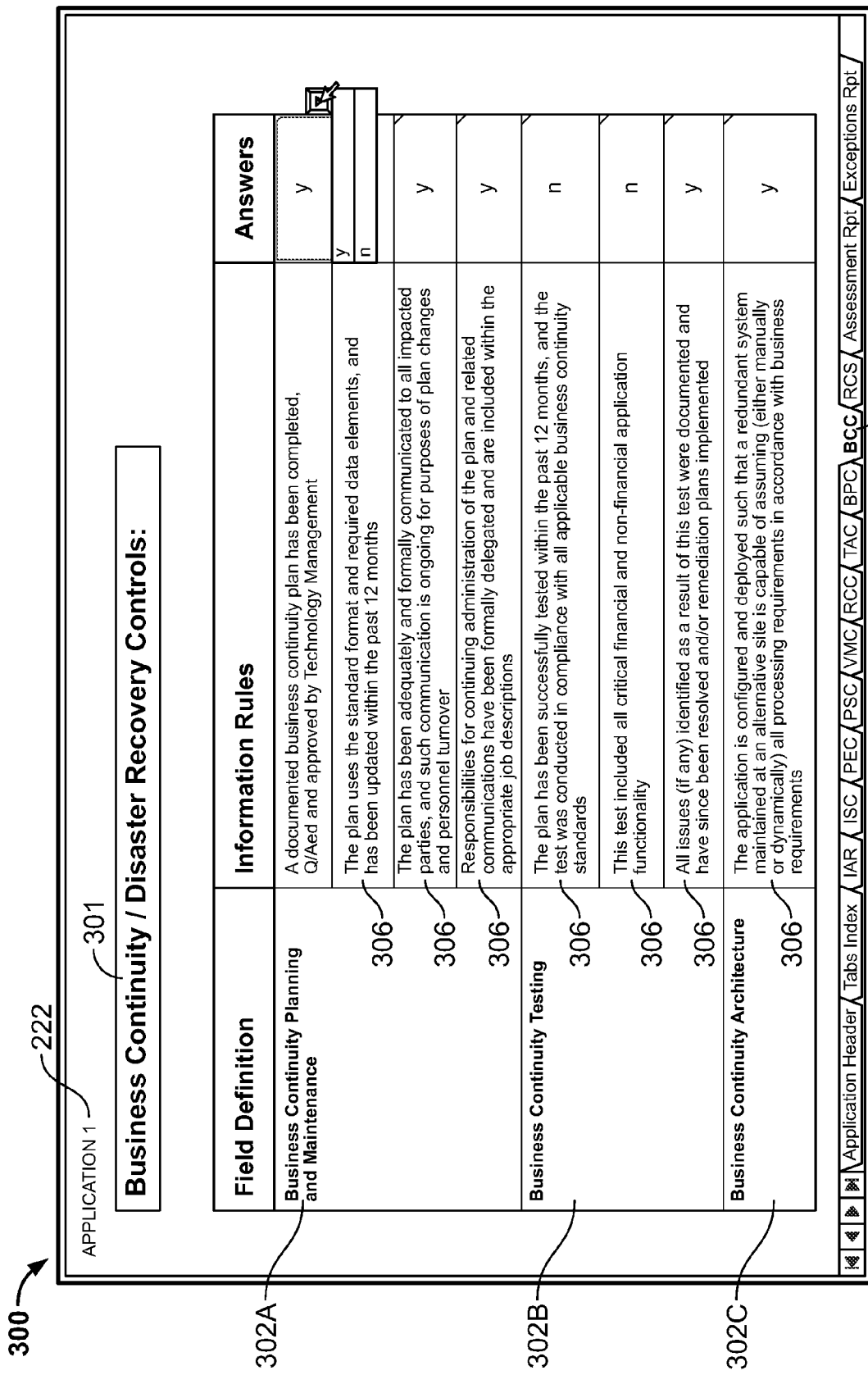

FIG. 5H presents a first screen 300 for the category of business continuity/disaster recovery controls (BCC) 301 for the application named "Application 1" 222. The BPC category includes at least three sub-categories 302A, 302B, 302C, each having one or more attributes, shown generally as 296. The BCC tab assesses the effectiveness of the application's business continuity and recovery controls.

Figure 6:
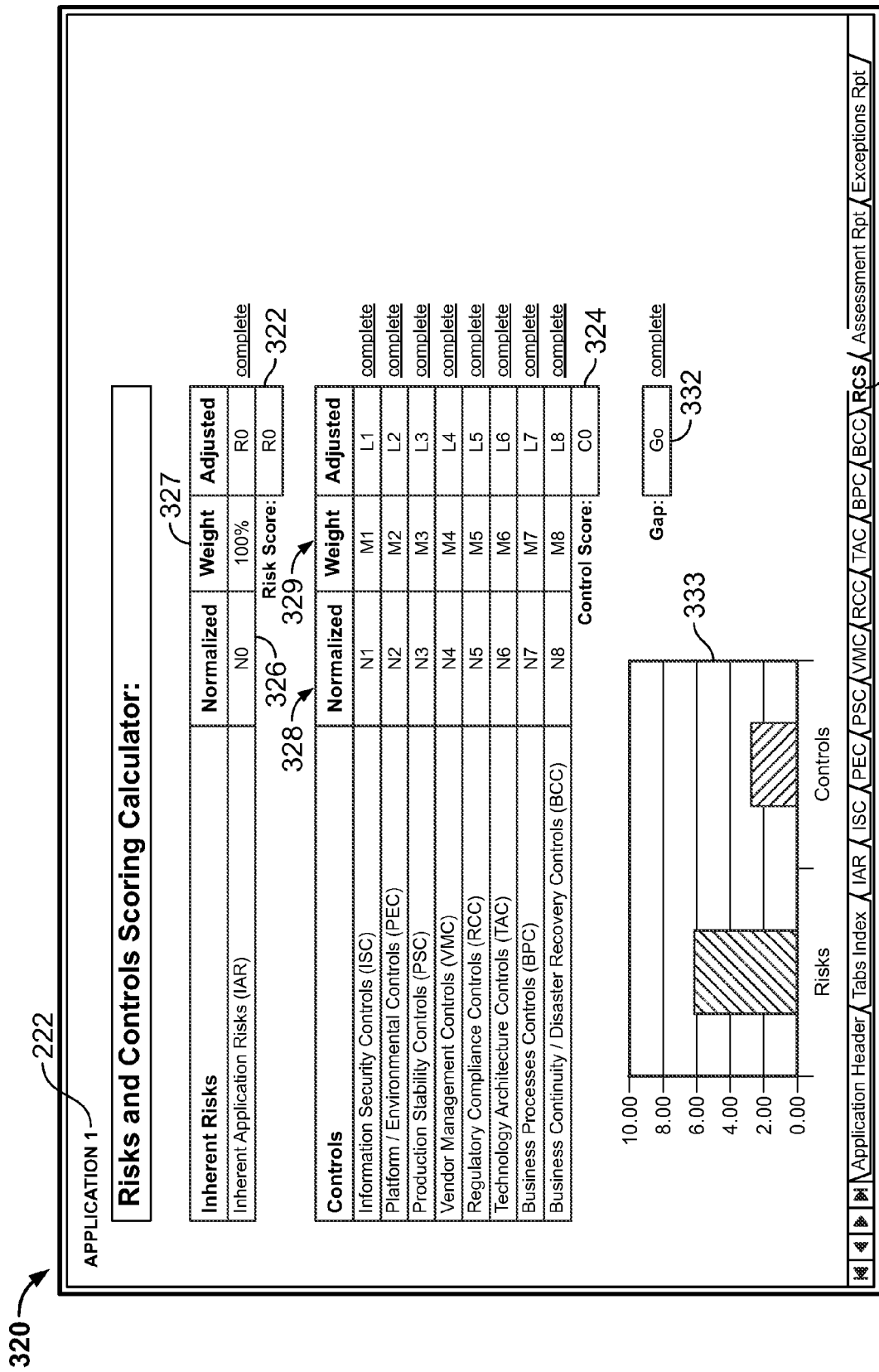
FIG. 6 shows a risk and control calculation page resulting from a user providing input to the risks in FIGS. 4A-4E and providing binary responses to the attributes in FIGS. 5A-5H.

FIG. 6 shows a screen 320 presenting information about the calculated risk score 322 (designated by variable R0) and the calculated control score 324 (designated by variable C0). The SAT's built-in risk calculator dynamically computes the assessed application's risk and control scores, and presents these results numerically and graphically. Each score is the result of applying a weighting function to normalized score. The normalized risk metric 326 (designated by variable N0) is scaled by a weight factor 327 (in this case, 100%) to arrive at the risk score 322. Each member of the plurality of normalized component control metrics 328 (designated by variables N1, N2, ..., N8) is scaled by a corresponding weight factor 329 (designated by variables M1, M2, ..., M8, which collectively total 100%) to arrive at weighted metrics (designated by variables L1, L2, ..., L8), and these weighted metrics are summed, to arrive at the control score 324. A value representing the difference, or gap 332 (designated by variable G0=R0−C0) between the risk score 322 and the control score 324 is displayed. A graphical comparison 333 of the risk score 322 and the control score 324 allows the user to view and compare the risk and control scores. In the screen 320, one or more of the weights M1, M2, ..., M8 can be zero. If for example, weights M4 and M5 are zero, this would mean that the application is not, and never has been, vendor supported nor is the business activity supported by this application subject to regulatory scrutiny.

It is understood that the values M1, M2, ..., M8 of the individual weight factors 329 will depend on how important each of the control categories is viewed by the tool's designers, users and others, for a particular application that is being assessed. It is also understood that flexibility may be provided to allow a given user to modify the weight factors 329. It is understood, however, that the same sub-categories and attributes are evaluated for every application that is being assessed, so that the resulting risk/control metrics can be compared across all applications.

In one embodiment, for each control category, the normalized component control metric 328 is calculated as follows:

(1) First, not applicable ("n/a") responses are thrown out and excluded from all further calculations. If all responses for a given category are "n/a", then that entire category is thrown out and its weight becomes 0%. To maintain a total weighting for all control categories of 100%, all other category weights are adjusted. Only the VMC and RCC categories have the potential to assume 0% weight.

(2) The total number of "y" responses is counted to create a "numerator" and the maximum possible number of "y" responses is counted to create a "denominator".

(3) The numerator is divided by the denominator to create the "Control Fraction" (a value between 0 and 1), and the Control Fraction is next multiplied by 10 to create the "Control Ratio" (a value between 0 and 10). Thus, the control fraction is a ratio between the total number of affirmative responses to whether a particular attribute has been implemented to the maximum possible number of affirmative responses.

(4) The Control Ratio is then adjusted (which includes being left unchanged) as follows: (a) If the percentage of "no" responses is >60% of total responses, the Control Ratio is reduced by 75%; (b) if the percentage of "no" responses is >40% but less <60% of total responses, the Control Ratio is reduced by 50%; (c) if the percentage of "no" responses is greater >20% but <40% of total responses, the Control Ratio is reduced by 20%; and (d) otherwise, the Control Ratio is left unchanged (at its full value). The adjusted Control Ratio is used as the normalized component control metric 328 for the corresponding category.

Figure 7:
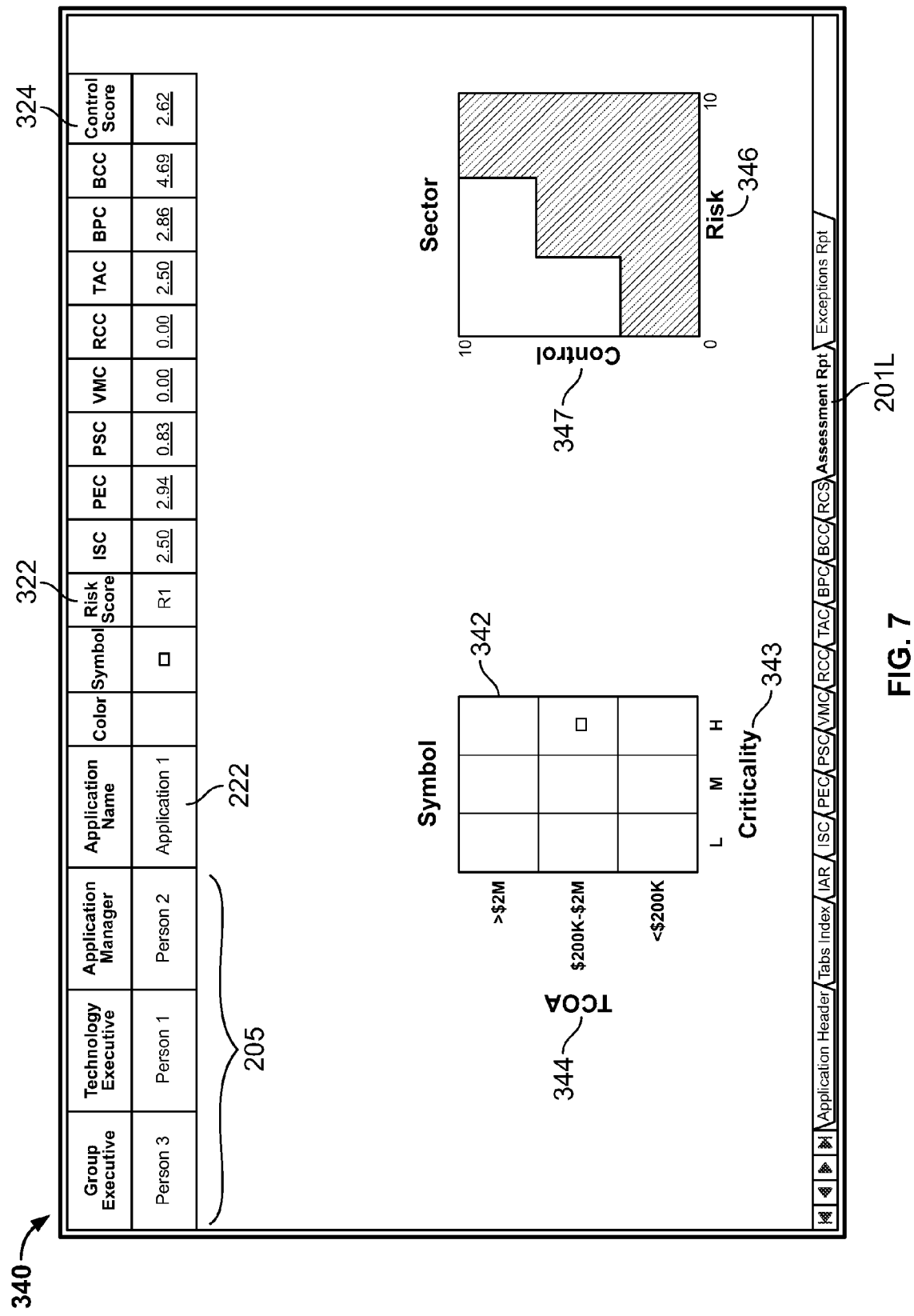
FIG. 7 shows a preliminary scoring assessment report created after the SAT has been invoked and input and responses have been provided.

While the foregoing is a preferred way of calculating the normalized control metrics 328, it is understood that other approaches, algorithms, and the like, may instead be used for this purpose. As an example, the control ratio may not be adjusted at all but instead used as the normalized component control metric FIG. 7 shows a screen 340 presenting an assessment summary report for that application. This report is created before the data is analyzed and consolidated into portfolio views. A first image 342 plots the application's criticality 343 and total cost of ownership 344. A second image 345 maps the application's risk 346 versus its control 347. Summaries 348 of the component risk and control scores are shown at the top of the report. These summaries include information 205 identifying the responsible individuals, the application's name 222, the risk score 322, the control score 324 and the normalized component control metrics 328. The SAT's assessment summary report may be reviewed with the application manager during mitigation discussions and planning.

FIG. 8 shows a screen 350 presenting an exceptions report which displays the responses 358 ("yes" and "no" and also possibly "n/a") to the various attributes 352. In a preferred embodiment, only the "no" responses are displayed. These responses are displayed in the context of the information 205 identifying the responsible individuals, the application's name 222, the risk score 322 (designated here by variable R2), the category 354 and sub-category 356. Like the SAT's assessment summary report, this report may be reviewed with the application manager during mitigation discussions and planning.

The foregoing description of the SAT examined specific risk factors, specific control categories and specific attributes. While these particular factors, categories and attributes may be suitable for assessing a software application, they may not be appropriate for assessing the risks and controls associated with some other type of object. Therefore, it is understood that one skilled in the art would find that other risk factors, other control categories and other attributes may be developed and used, as dictated by the nature of the risks and controls applicable to the object being assessed.

Risk/Control Reporting Tool

Figure 9:
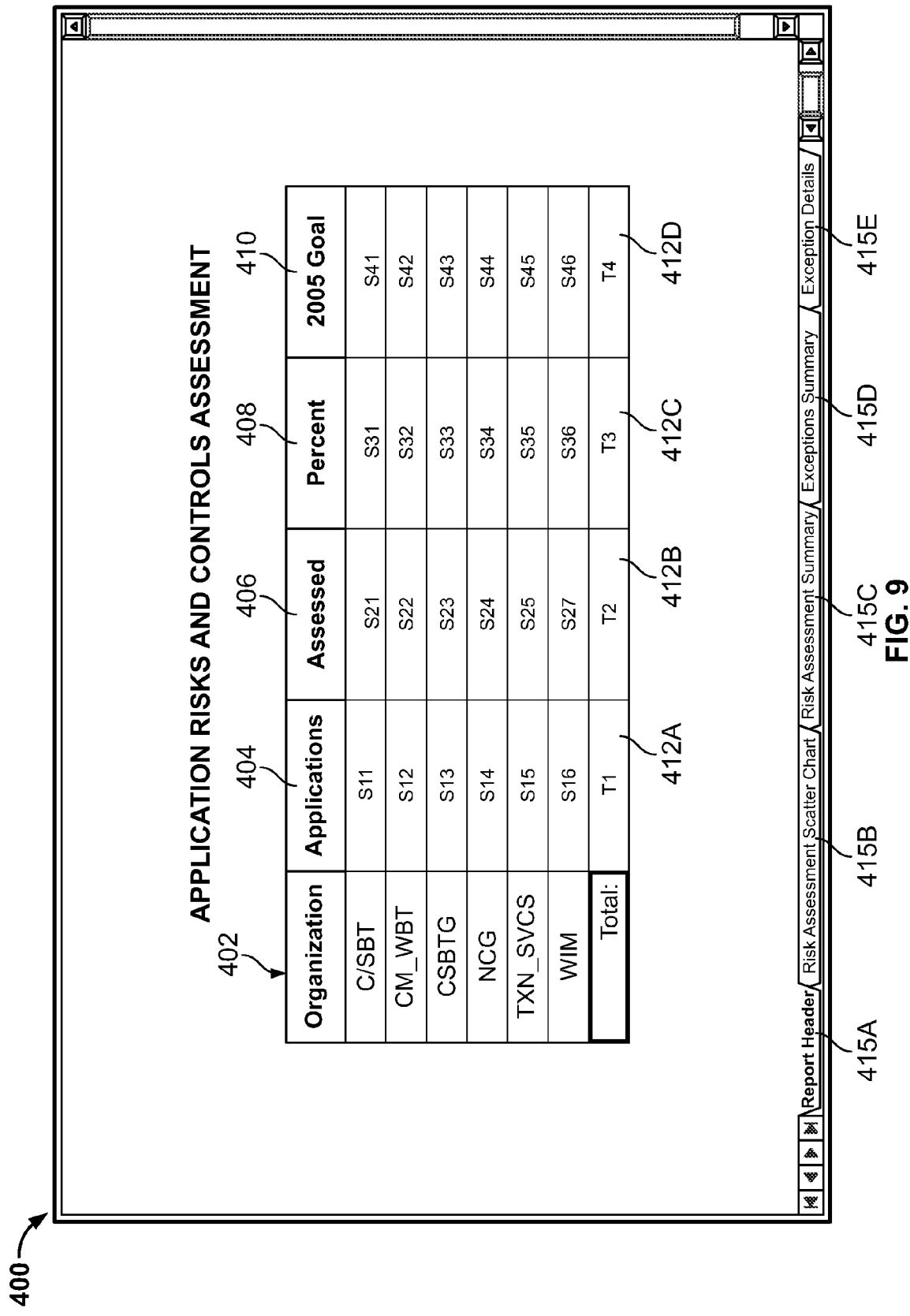
FIG. 9 shows a summary report page from a risk evaluation tool (RET) invoked to track applications risk assessed versus established goals and populations of applications by organization.

In one embodiment, the Risk/Control Reporting Tool (RET) is an MS-EXCEL® Workbook containing multiple tabs. The results from the individual SATs which have been aggregated into the database 120 are loaded into the RET. The RET provides interested personnel, such as group executives, technology executives, application managers, risk managers, and others, with a variety of portfolio views, across all applications that have been entered. If desired, privileges may be established which permit an individual to access only a portion of the aggregated data, such as information about only those applications that that individual needs to know about. The RET is provided with a collection of filtering and query capabilities, together with embedded data links to enable interested personnel to quickly identify and focus upon risk/control imbalances (gaps) within assessed applications and across application groups:

FIG. 9 shows the assessment report header summary page 400 of the RET. The page 400 presents information about the goals and progress of completing assessments across all applications throughout an organization. For each business unit 402, the summary page provides information about the number of applications 404 (designated by variables S11, S12, . . . , S16) belonging to a particular division or business unit, the number of applications that have been assessed 406 using the SAT (designated by variables S21, S22, . . . , S26), the percentage of assessed applications 408 (designated by variables S31, S32, . . . , S36), and the goal 410 (designated by variables S41, S42, . . . , S46) for how many are to be assessed in a particular calendar year or other defined risk assessment period. Aggregate values for these measures 412A, 412B, 412C and 412D, designated by variables T1, T2, T3 & T4, respectively, are provides across all the business units.

At the bottom of the summary page are a plurality of tabs. Tab 415A is for the current view 400; tab 415B directs the user to a risk assessment scatter plot page 430; tab 415C directs the user to a risk assessment summary page 450; tab 415D directs the user to an exceptions summary screen 470; and tab 415E directs the user to an exceptions detail page 490, each of which is described in further detail below.

Figure 10A:
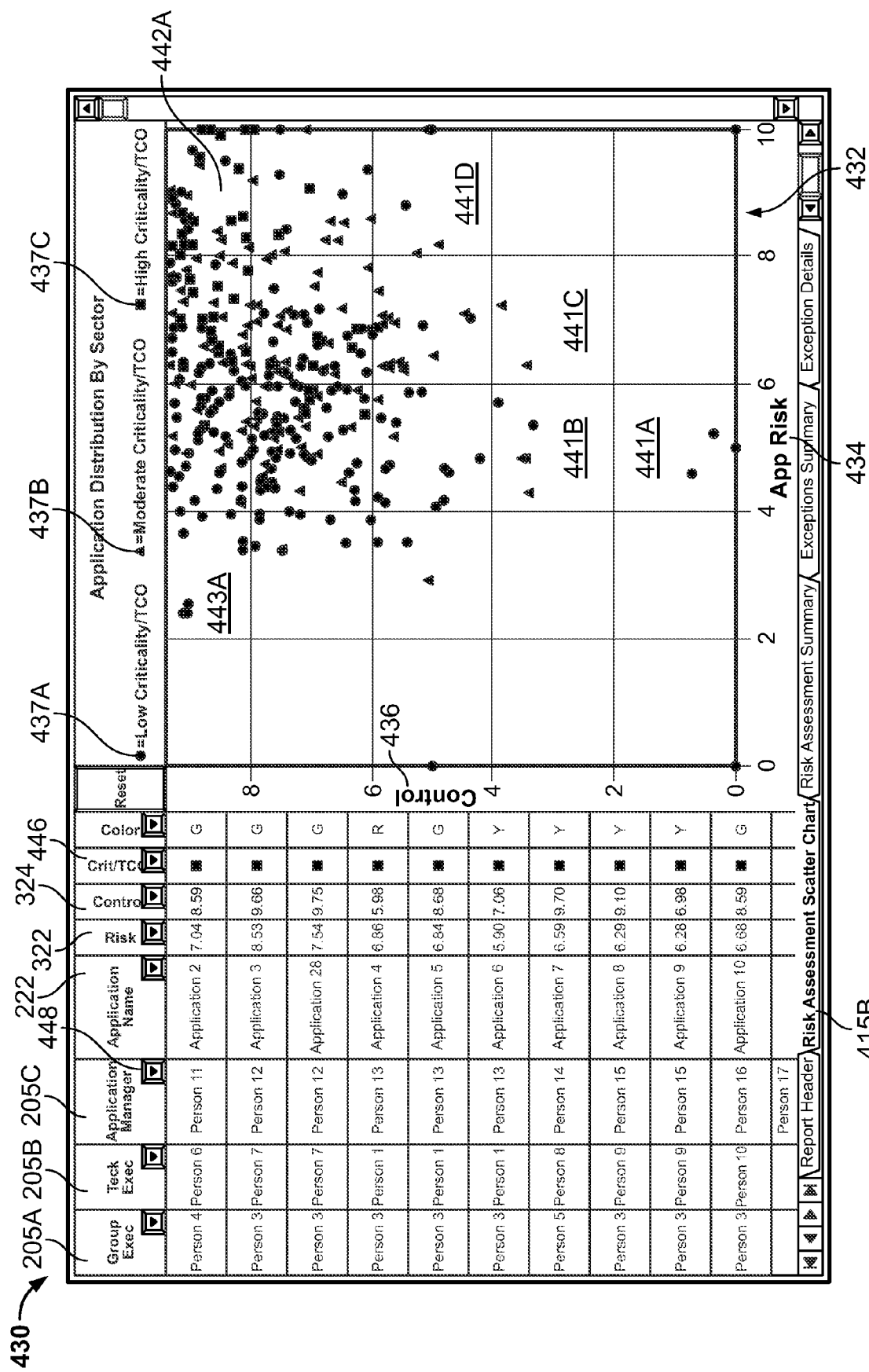
FIG. 10A shows the risk assessment scatter chart and related information, from the RET.

FIG. 10A shows a "Scatter Chart" page 430 comprising a scatter chart 432, which in this instance is a multi-dimensional graphical plot for all assessed applications. The scatter chart 432 plots risk scores 434 having a range of 0-10 on the X-axis plotted against control scores 436 having a range of 0-10 on the Y-axis. The scatter plot is designed to help management focus upon those applications for which the risk/control balance may be inappropriate. Various indicia, such as differently shaped icons, shown here in the form of solid circles 437A, solid triangles 437B and solid squares 437C provide an objective measure of a combination of criticality and/or cost of a particular data point, allowing a viewer to focus on important data points. In one embodiment, the various icon designs and plotting patterns are plotted above differently colored backgrounds to denote the relative presence or absence of commensurate risk and control. For instance, red background may denote areas of the scatter plot in which the level of control likely is inappropriate in view of the risks, a green background may denote areas of the scatter plot in which the level of control likely is appropriate in view of the level of risk, and a yellow background may denote areas of the scatter plot in which it is not completely clear whether the level of control is appropriate in view of the level of risks.

Applications plotted into sectors having a combination of high risk scores and low control scores, such as sectors 441A, 441B, 441C and 441D, may be considered under-controlled and may deserve prompt attention. Applications having both high control and high risk, such as in sector 442A may be considered to have an adequate risk/control balance. On the other hand, applications having low-to-moderate risk and high control, such as in sector 443A may be considered potentially over-controlled (though not necessarily over-controlled since some controls may be mandatory) and subject to an evaluation to determine whether some of the controls may be relaxed, thereby achieving savings in cost. Applications plotted into other sectors may be categorized into one of the above groups, or even newer groups, depending on the risk/control preferences of the organization.

It should be evident to those skilled in the art that the entire scatter plot 432 may be divided into either larger or smaller sectors depending on the position of the grid lines. It should also be evident that portions of the scatter plot 432, such as individual sectors, may be color-coded, e.g., 'red' indicating under-controlled, 'green' indicating adequately controlled, and 'yellow' indicating over-controlled, to help focus a viewer's attention.

The scatter plot 432 is accompanied by columns of information about all of the plotted applications. In one embodiment, these columns of information include an identification of the individuals responsible 205 for each assessed application, including a group executive 205A, a technology executive 205B and the application manager 205C. The columns may also include the application name 222, the risk score 322 for that application, the control score 324 for that application, and an indication 446 of the criticality/cost of the application.

When pressed, drop-down arrows 448 in the column headings will present filtering selections for the related topics. Filters can be used in combination to narrow focus on items of interest. The scatter plot and all related data will dynamically change to display only those items to which the filters apply.

For instance, each of the columns for the responsible individuals 205A, 205B, 205B may be filtered so that the scatter plot will show only applications for which a subset of all individuals are responsible. Boolean operators may be used within a single column to plot applications for which a particular desired combination of individuals are responsible. For example, one can filter only the "group executive" column 205A to request that the scatter plot 432 only display applications for which two specific group executives are responsible. Filtering multiple columns performs a logical "AND" operation so that the scatter plot will show only applications for which a particular intersection of the individuals from each filtered column are responsible.

In addition, one may filter the risk scores 322 to specify a range of risk scores, or even non-contiguous ranges of risk scores using Boolean operators. The control scores 324 may be filtered in the same manner. Filtering may also be used to specify only those applications meeting a predetermined criticality/cost criterion 446 or those present in a particular sector.

It should be evident from the foregoing that each assessed application has a corresponding data point in some multi-dimensional hyperspace. And in one embodiment, these dimensions include three separate individuals, a risk score, a control score, a criticality parameter, a cost parameters, and the like. It should also be evident that one may use the RET to focus in a particular subspace of this hyperspace, or even on a single application by using the provided filtering capabilities. The resulting filtered scatter chart thus enables views of individual applications or application groups along dimensions of inherent risks, controls, business criticality and application total cost of ownership.

Figure 10B:
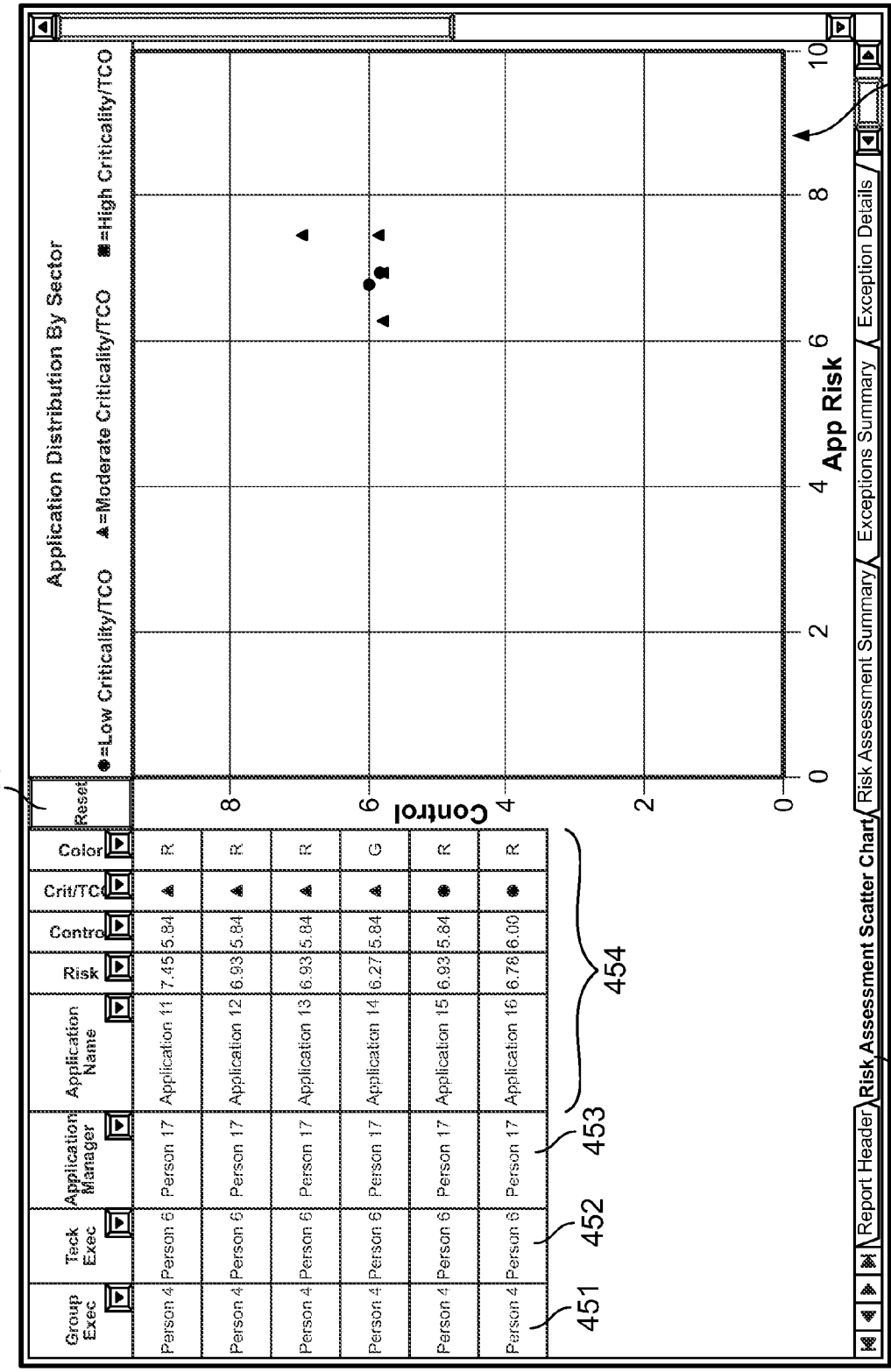
FIGS. 10B & 10C show the effects of applying specific filters to the risk assessment scatter chart of FIG. 10A.

FIG. 10B shows a filtered scatter plot 450 resulting from specifying (i.e., filtering) the following triplet of responsible individuals: Group Executive (named "Person 4") 451, Technology Executive (named "Person 6") 452 and Application Manager (named "Person" 17) 453. Only those applications having this combination of responsible individuals are then plotted on the scatter plot 450, and the other 'filtered' columns 454 simply present the corresponding values and parameters. Thus, in one aspect, the RET can be used as an accountability tool that links responsible individuals to the applications under their purvey.

Figure 10C:
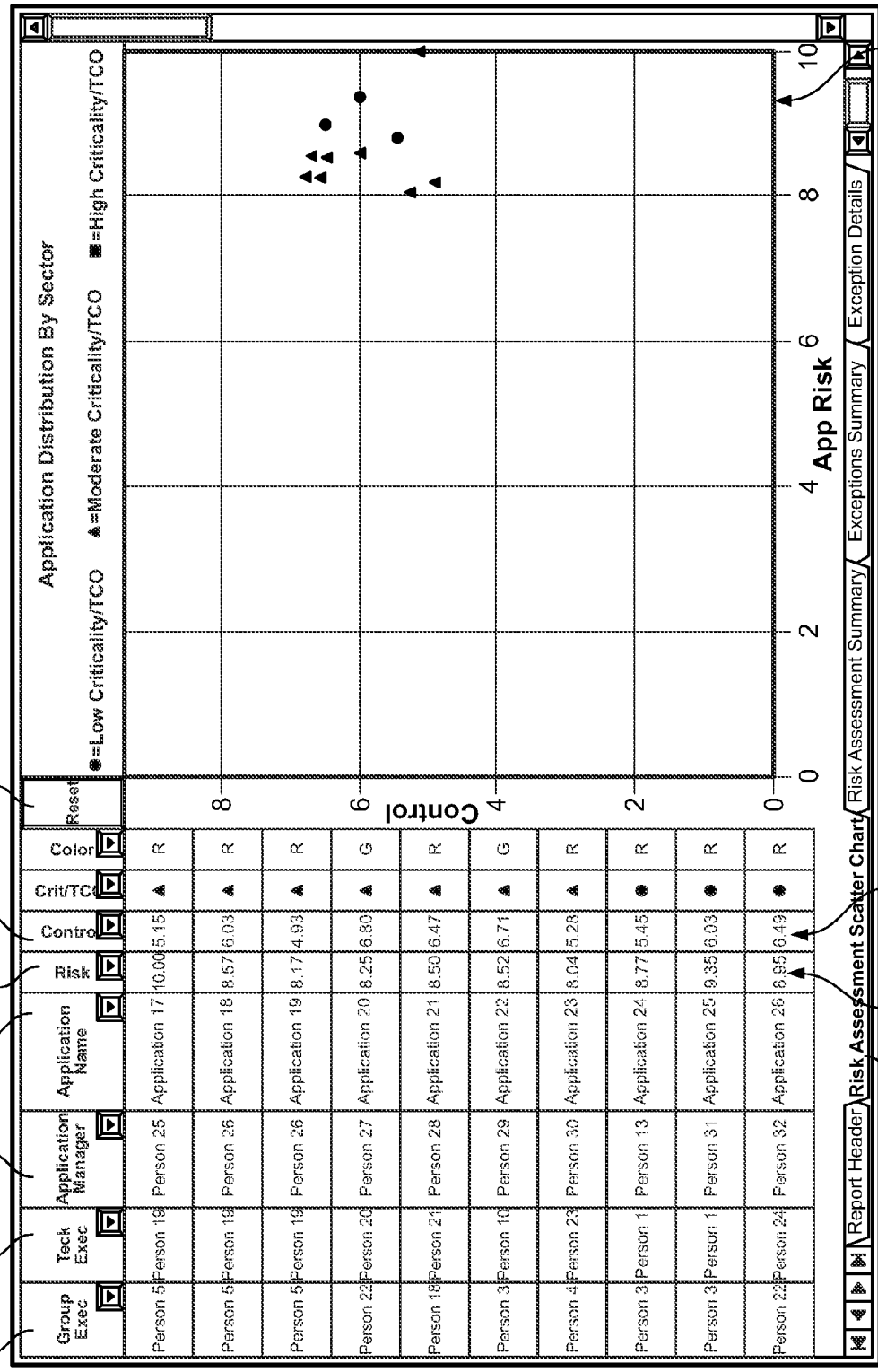

FIG. 10C shows a filtered scatter plot 460 resulting from specifying that only those applications having a risk score 462 greater than 8.0 and also a control score 464 less than 7.0 be shown.

A "reset" button 479 can be used to restore the view so that all filters are set to 100% (i.e., no filtering) and the assessed applications are once again included on the scatter plot. This allows a viewer to continue to study the data with a different combination of filters.

FIG. 11A shows risk assessment summary page 470 which displays a table 472 showing each of the eight normalized component control metrics 474, one for each control category, and the control score 324 for the assessed applications. This page 470 allows a viewer to study the individual control components which resulted in the control score. Individual metrics may be colored in different ways, depending on their values. For instance, low-valued metrics may be represented in red 478R, high-valued metrics may be displayed in green 478G, intermediate-valued metrics may be displayed in yellow 478Y, and white spaces 478W may be used for those instances in which that particular control category was not applicable. Filtering can be performed on any combination of the columns, including the risk score 322, the responsible individuals 205A, 205B, 205C, and even the application name 222.

Figure 11B:
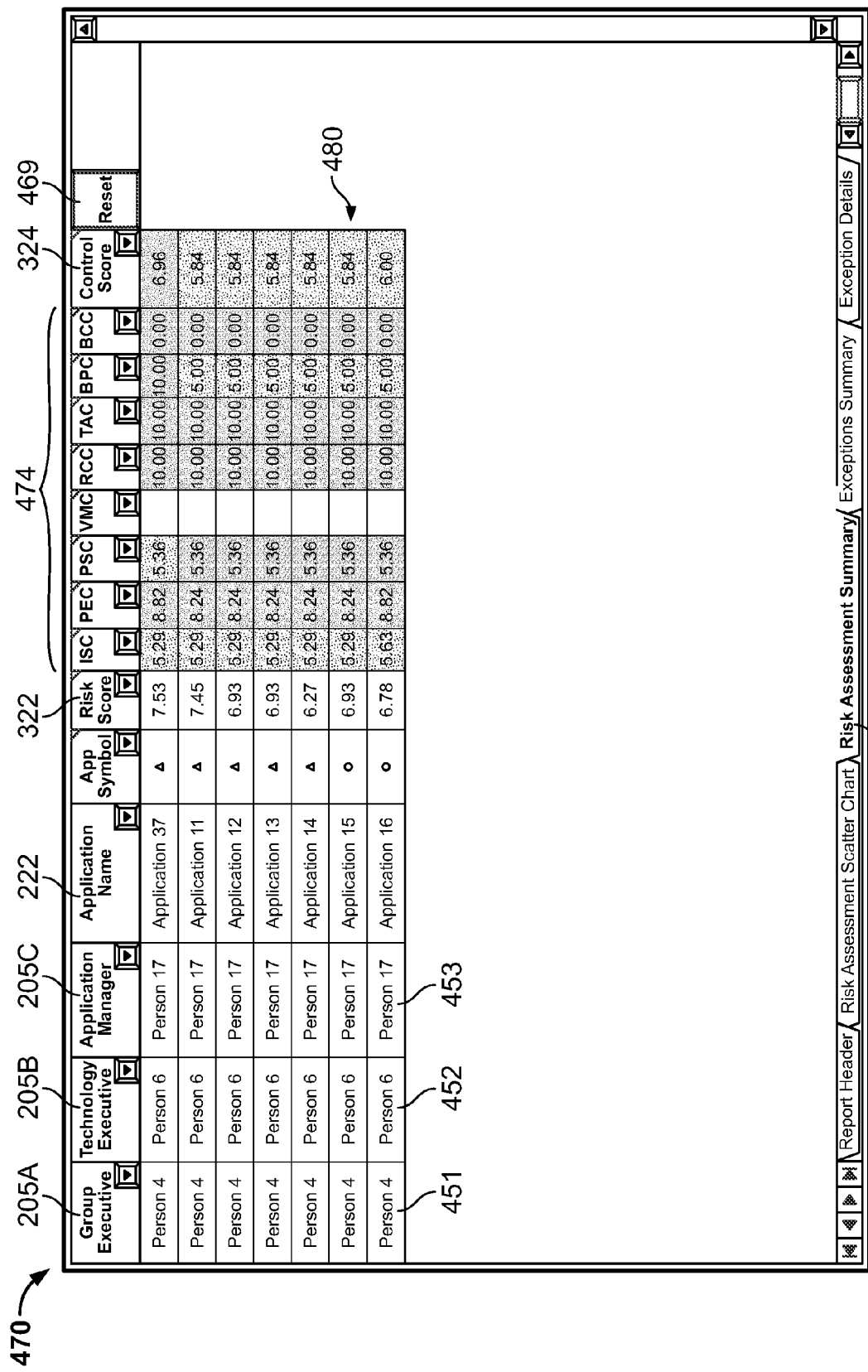

FIG. 11B shows a filtered risk assessment summary page, in which the table 480 results from specifying (i.e., filtering) the following triplet of responsible individuals: Group Executive (named "Person 4") 451, Technology Executive (named "Person 6") 452 and Application Manager (named "Person" 17) 453. The risk assessment summary is then displayed for only those applications having this combination of responsible individuals. This allows a viewer to gain insights into how effectively this combination of individuals implements controls to combat risks.

FIG. 11C shows a filtered risk assessment summary page, in which the table 490 results from specifying that only those applications having a risk score 462 greater than 8.0 and also a control score 464 less than 7.0 be shown.

FIG. 12A shows an exceptions summary page 500 which presents control exceptions 502 for each application within the assessed portfolio. In this context, a 'control exception' is a question/attribute to which the answer was "no", a "no" response having designated the absence of a desirable control. In its initial display, summary page 500 ranks the questions/attributes in descending order, based on the percentage of "no" responses obtained by SAT. A number of columns containing pertinent information are displayed on this page 500. These include an indication of the control category 504, the control sub-category 506, the text of the attribute 508 to which the "no" response was given, a question key index 510, the total number of "no" responses 512 (the numbers being represented by X1, X2, etc.), and the percentage of no responses 514 (the percentages being represented by Y1, Y2, etc.). Each of these columns is filterable.

FIG. 12B shows a filtered exception summary page which results from specifying (i.e., filtering) the category 504 and sub-category 506 columns of the exception summary page 500. In this instance, the category filter was set to "Info Security Controls" 516 and the sub-category filter was set to "Governance and Admin" 518. Only seven questions/attributes had "no" responses (the numbers being represented by V1, V2, etc) to this category/sub-category combination across all the assessed applications, and these are displayed, in descending order of percentage of "no" responses (the percentages being represented by W1%, W2%, etc.). A viewer may set additional filter parameters, such as 'only showing "no" percentages greater than 15%', etc.

Figure 13A:
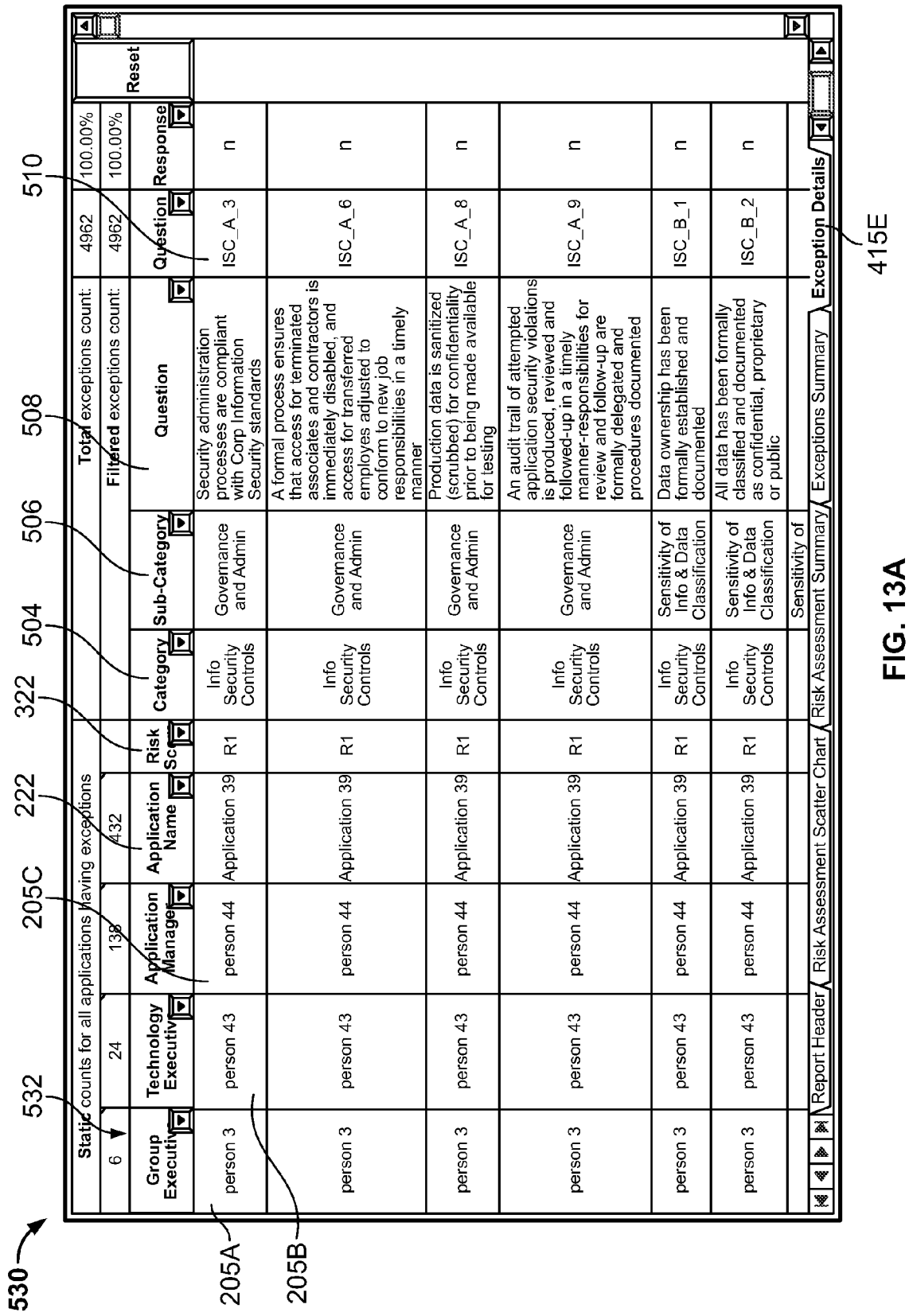
FIG. 13A shows an exception detail table from the RET, presenting identifying information about the applications and individuals responsible for applications receiving "no" responses to the questions/attributes.

FIG. 13A shows an exceptions detail page 530. This page 530 enables viewing of specific control weaknesses at any organizational level within the assessed application population. The columns on this page include the responsible individuals 205A, 205B, 205C, the application name 222, the risk score 322 (designated here by variable R1), the control category 504, the control sub-category 506, the text of the question/attribute 508 and the unique question key index 510. Again, each of these columns may be filtered. Counts 532 reflective of the population of some of the columns are given to provide an insight into the extent of the exceptions.

FIG. 13B shows a filtered exceptions detail page which results from specifying (i.e., filtering) the following triplet of responsible individuals: Group Executive (named "Person 4") 451, Technology Executive (named "Person 6") 452 and Application Manager (named "Person" 17) 453. Only those applications having this combination of responsible individuals, and for which a "no" response was given to a question/attribute 508, are shown.

It can be seen from the foregoing, that the RET allows a viewer to study the data collected from the SAT from various perspectives.

In one respect, the SAT is a software tool configured to collect information about risks, and controls implemented to mitigate the risks, the risks and controls being associated with a plurality of software applications. The SAT software tool is configured to receive information sufficient to uniquely identify each software application, receive risk input reflective of a risk level associated with each of a plurality of risk categories associated with said each software application, compute at least one risk score based on said risk input; and receive a plurality of control responses indicative of whether or not each of a plurality of control attributes has been implemented.

As to the RET, in one respect, the RET is a software tool configured to help understand the nature of risks, and controls implemented to mitigate the risks, the risks and controls being associated with a plurality of software applications. At a basic level, the RET is configured to display information associated with both calculated risk scores and calculated control scores for a plurality of software applications and permit filtering to study only a portion of said information.

Thus, the two tools are intended to be employed by the same organization. Thus, in some embodiments, the SAT and the RET may be combined into a single Applications Risk and Control Assessment Tool (ARCAT). However, when appropriate, they may be separated, either as distinct software applications, or perhaps through privilege settings, so that a particular individual may only have access to one or the other of the two tools.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for evaluating both risks and controls implemented to mitigate the risks associated with a plurality of objects, the method comprising:

for each of a plurality of objects
receiving information at a self assessment computer sufficient to uniquely identify the object;
receiving, at the self assessment computer, risk input reflective of a risk level associated with each of a plurality of risk categories associated with that object;
receiving, at the self assessment computer, a plurality of control responses indicative of whether or not each of a plurality of control attributes has been implemented, wherein the plurality of control attributes are organized into a plurality of control categories;
storing the information, the risk input, and the plurality of control responses in a relational database associated with the self assessment computer;
computing, using the self assessment computer, at least one risk score based on said risk input;
computing, using the self assessment computer, at least one control score based on said plurality of control responses, wherein said step of computing at least one control score comprises first computing component control metrics for each of said plurality of control categories by computing a ratio between a number of affirmative responses regarding whether a particular control attribute has been implemented to a maximum possible number of affirmative responses for that control category;
storing on the self assessment computer a plurality of adjustment levels, wherein the plurality of adjustment levels comprise:
if a percentage of the affirmative responses is less than a first percentage of the maximum possible number of affirmative responses, the ratio is reduced by a first adjustment level;
if the percentage of the affirmative responses is less than a second percentage but greater than or equal to the first percentage of the maximum possible number of affirmative responses, the ratio is reduced by a second adjustment level; and
if the percentage of the affirmative responses is less than a third percentage but greater than or equal to the second percentage of the maximum possible number of affirmative responses, the ratio is reduced by a third adjustment level;
determining, using the self assessment computer, which of the plurality of adjustment levels applies to the ratio; and
adjusting the ratio based on the determination.

2. The method according to claim 1, wherein the objects comprise software applications.

3. The method according to claim 2, comprising receiving information identifying at least two individuals in an organizational hierarchy who are responsible for each software application.

4. The method according to claim 1, wherein the plurality of control attributes are organized into at least five control categories.

5. The method according to claim 1, wherein at least one of said plurality of control categories comprises at least two control sub-categories, each control sub-category having at least two control attributes.

6. The method according to claim 2, further comprising simultaneously displaying information reflective of risk scores and control scores computed for a plurality of software applications.

7. The method according to claim 6, wherein the information is displayed on a scatter plot.

8. The method according to claim 6, comprising setting one or more filters to focus on a subset of said plurality of software applications.

9. The method according to claim 8, wherein the subset comprises only those software applications associated with one or more particular individuals.

10. The method according to claim 8, wherein the subset comprises only those software applications associated with a specified range of risk scores or control scores, or both.

11. The method according to claim 6, comprising displaying a plurality of component control metrics for each of the plurality of control categories, for the plurality of software applications.

12. The method according to claim 2, further comprising displaying exception information indicative of which control attributes have not been implemented.

13. The method according to claim 12, comprising displaying a total number, or percentage, or both, of software applications for which a particular control attribute has not been implemented.

14. The method according to claim 12, comprising displaying a text of each control attribute that has not been implemented.

15. The method according to claim 12, comprising displaying a control category and control sub-category associated with each control attribute that has not been implemented.

16. The method according to claim 12, comprising setting one or more filters to focus on a subset of all control attributes that have not been implemented.

17. The method according to claim 16, wherein the subset comprises only those control attributes that have not been implemented and are associated with one or more particular individuals.

18. The method according to claim 16, wherein the subset comprises only those control attributes that have not been implemented and are associated with a particular category and sub-category.

19. An apparatus configured to aid in understanding risks and controls implemented to mitigate the risks for a plurality of software applications comprising:
an input module configured to receive first information that uniquely identifies an object, risk input reflective of a risk level associated with each of a plurality of risk categories associated with that object, and a plurality of control responses indicative of whether or not each of a plurality of control attributes has been implemented, wherein the plurality of control attributes are organized into a plurality of control categories;
a database configured to store the first information, the risk input, the plurality of control responses, and a plurality of adjustment levels used in calculating at least one control score;
a self assessment computing module configured to compute at least one risk score based on said risk input and the at least one control score based on said plurality of control responses;
an output module configured to display second information associated with both the computed at least one risk score and the computed at least one control score, the output module also configured to permit filtering to study only a portion of said second information, wherein the at least one control score is calculated by first computing component control metrics for each of the plurality of control categories, wherein the component control metrics are calculated by computing a ratio between a number of affirmative responses regarding whether a particular control attribute has been implemented to a maximum possible number of affirmative responses for each control category, wherein the plurality of adjustment levels comprise:

if a percentage of the affirmative responses is less than a first percentage of the maximum possible number of affirmative responses, the ratio is reduced by a first adjustment level;

if the percentage of the affirmative responses is less than a second percentage but greater than or equal to the first percentage of the maximum possible number of affirmative responses, the ratio is reduced by a second adjustment level; and if the percentage of the affirmative responses is less than a third percentage but greater than or equal to the second percentage of the maximum possible number of affirmative responses, the ratio is reduced by a third adjustment level;

wherein the self assessment computing module is further configured to determine which of the plurality of adjustment levels applies to the ratio and adjust the ratio based on said determination.

20. The apparatus according to claim 19, wherein the output module is further configured to selectively display said second information on a scatter plot which plots risk scores versus control scores for a plurality of software applications.

21. The apparatus according to claim 19, wherein the output module is further configured to selectively set one or more filters to study a subset of said plurality of software applications.

22. The apparatus according to claim 21, wherein the subset comprises only those software applications associated with one or more particular individuals responsible for said subset.

23. The apparatus according to claim 21, wherein the subset comprises only those software applications associated with a specified range of risk scores or control scores, or both.

24. The apparatus according to claim 19, wherein the output module is further configured to selectively display the plurality of component control metrics for each of the plurality of control categories, for each of a plurality of software applications.

25. The apparatus according to claim 19, wherein the output module is further configured to selectively display exception information indicative of which control attributes have not been implemented.

26. The apparatus according to claim 25, wherein the output module is further configured to selectively display a total number, percentage, or both, of software applications for which a particular control attribute has not been implemented.

27. The apparatus according to claim 25, wherein the output module is further configured to selectively display a text of each control attribute that has not been implemented.

28. The apparatus according to claim 25, wherein the output module is further configured to selectively display a control category and a control sub-category associated with each control attribute that has not been implemented.

29. The apparatus according to claim 25, wherein the output module is further configured to selectively display a subset of all control attributes that have not been implemented.

30. The apparatus according to claim 29, wherein the subset comprises only those control attributes that have not been implemented and are associated with one or more particular individuals.

31. The apparatus according to claim 29, wherein the subset comprises only those control attributes that have not been implemented and are associated with a particular category and sub-category.

* * * * *